United States Patent
Leinhard et al.

(10) Patent No.: US 12,440,148 B2
(45) Date of Patent: Oct. 14, 2025

(54) METHOD OF EVALUATING A MUSCLE RELATED CONDITION

(71) Applicant: AMRA Medical AB, Linköping (SE)

(72) Inventors: Olof Dahlqvist Leinhard, Linköping (SE); Jennifer Linge, Linköping (SE); Per Widholm, Linköping (SE)

(73) Assignee: AMRA MEDICAL AB, Linköping (SE)

( * ) Notice: Subject to any disclaimer, the term of this patent is extended or adjusted under 35 U.S.C. 154(b) by 973 days.

(21) Appl. No.: 17/428,524

(22) PCT Filed: Feb. 7, 2020

(86) PCT No.: PCT/EP2020/053068
§ 371 (c)(1),
(2) Date: Aug. 4, 2021

(87) PCT Pub. No.: WO2020/161274
PCT Pub. Date: Aug. 13, 2020

(65) Prior Publication Data
US 2022/0125373 A1    Apr. 28, 2022

(30) Foreign Application Priority Data
Feb. 8, 2019  (EP) ...................................  19156100

(51) Int. Cl.
*A61B 5/00*    (2006.01)
*A61B 5/055*   (2006.01)
(Continued)

(52) U.S. Cl.
CPC ............ *A61B 5/4519* (2013.01); *A61B 5/055* (2013.01); *G16H 10/60* (2018.01); *G16H 50/20* (2018.01); *G16H 50/30* (2018.01)

(58) Field of Classification Search
None
See application file for complete search history.

(56) References Cited

U.S. PATENT DOCUMENTS

| | | | |
|---|---|---|---|
| 10,327,692 | B2 | 6/2019 | Uchiyama |
| 2018/0326149 | A1 | 11/2018 | Lipschultz et al. |
| 2018/0368729 | A1 | 12/2018 | Wilson et al. |

FOREIGN PATENT DOCUMENTS

JP    2015029832 A    2/2015

OTHER PUBLICATIONS

Addison et al., "Intermuscular Fat: A Review of the Consequences and Causes", International Journal of Endocrinology, vol. 2014, Jan. 8, 2014, (12 pages).
(Continued)

*Primary Examiner* — Benjamin S Melhus
(74) *Attorney, Agent, or Firm* — Kagan Binder, PLLC

(57) ABSTRACT

The present invention relates to a method (100) and system for evaluating a muscle related condition for a subject individual. The method comprises the steps of acquiring (101) a muscle quantity value (20) for the subject individual; acquiring (102) a data parameter value (10) for the subject individual, wherein the data parameter value relates to a quantified parameter of the subject individuals body composition; selecting (103) a number of individuals from a database (30) comprising at least one data parameter value (31) for a plurality of individuals and muscle quantity values (32) for said plurality of individuals, wherein the selection is based on the at least one data parameter value being compared to the subject individuals at least one data parameter value, thereby creating a virtual control group (VCG) (40); calculating (104) a prediction value (50) of the muscle quantity values (42) for the individuals in the VCG (40); and comparing (105) the muscle quantity value (20) for the subject individual to the determined prediction value (50) of the VCG (40).

15 Claims, 11 Drawing Sheets

(51) Int. Cl.
*G16H 10/60* (2018.01)
*G16H 50/20* (2018.01)
*G16H 50/30* (2018.01)

(56) References Cited

OTHER PUBLICATIONS

Indian Examination Report for Indian Application No. 202127026662, mailed Apr. 26, 2024. (6 pages).
International Search Report and Written Opinion for International Application No. PCT/EP2020/053068, mailed Apr. 22, 2020, (2 pages).
Bosy-Westphal et al., "Identification of skeletal muscle mass depletion across age and BMI groups in health and disease-there is need for a unified definition", International Journal of Obesity, vol. 39, No. 3, pp. 379-386, 2014, (8 pages).
Kelly et al., "Dual Energy X-Ray Absorptiometry Body Composition Reference Values from Nhane", PLoS One, vol. 4, No. 9, page e7038, 2009, (8 pages).
Sarc et al., "Low FFMI according to ESPEN cut-offs is a strong independent predictor of mortality in patients with COPD", European Respiratory Journal, vol. 62, No. suppl. 62, 2018, (6 pages).
Rubbieri et al., "Techniques for the diagnosis of sarcopenia", Clinical Cases in Mineral and Bone Metabolism, vol. 11, No. 3, pp. 181-184, 2014, (4 pages).
Cruz-Jentoft et al., "Sarcopenia: European consensus on definition and diagnosis: Report of the European Working Group on Sarcopenia in Older People", Age and Ageing, Bailliere Tindall, London, US, vol. 39, No. 4, pp. 412-423, 2010, (12 pages).
First Chinese Office Action, and English Summary of Office Action therefore, for Chinese Counterpart Application No. 20208007628.8, mailed Aug. 8, 2024, (9 pages).

METHOD OF EVALUATING A MUSCLE RELATED CONDITION

CROSS-REFERENCE TO RELATED APPLICATIONS

This application claims priority to International Application No. PCT/EP2020/053068, filed Feb. 7, 2020 and titled "METHOD OF EVALUATING A MUSCLE RELATED CONDITION," which in turn claims priority from a European Patent Application having Ser. No. 19/156,100.0, filed Feb. 8, 2019, titled "METHOD OF EVALUATING A MUSCLE RELATED CONDITION," both of which are incorporated herein by reference in their entireties.

TECHNICAL FIELD

The present disclosure relates to a method of evaluating a muscle related condition for a subject individual, and especially a method using a muscle quantity value as part of the input data.

BACKGROUND

There are many different methods for identifying health related conditions for an individual. Some muscle related conditions, such as sarcopenia, develop slowly over time, which may make commonly used methods, in which specific tests are repeated, difficult to use.

For example, Sarcopenia is a condition characterized by progressive loss of muscle quantity and function over time associated to adverse outcomes in several different disease areas.

For identification of low muscle mass, dual-energy X-ray absorptiometry (DXA) and bioelectrical impedance analysis (BIA) are widely used to estimate appendicular skeletal muscle mass (ASM) and provide basis for identification of thresholds sensitive to subjects with particularly low muscle mass.

A major challenge in understanding sarcopenia and its consequences is the wide variation in normal physiology present in the general population. The aetiology for low muscle quantity is naturally widespread; Certain phenotypes with low muscle quantity could be associated with longevity as a healthy lifestyle in combination with low-caloric intake may result in low muscle quantity. Identification of such individuals as sarcopenic is problematic from a specificity perspective of a sarcopenia definition. Increasingly more problematic to current sarcopenia definitions, from the individual's perspective, is the growing obesity epidemic complicating early diagnosis. With higher body mass index (BMI), the muscle quantity increases as a result of the individual carrying an increasingly larger body weight, making the identification of sarcopenic patients by low muscle quantity more difficult. This have led to disclosed methods of applying a range of body size adjustments to measured muscle quantity, namely by dividing e.g. ASM with height$^2$, weight, or BMI. However, there is still an ongoing debate about what the preferred adjustment is, and the recently updated European consensus on definition and diagnosis of sarcopenia (EWGSOP2) makes no specific recommendation. Another challenge for detection of sarcopenic obesity is that the loss of fat mass due to wasting can, for increased lengths of time, be obscured by the willingness of the patient to lose weight. In addition to these challenges, different DXA instrument brands do not give consistent results and muscle mass measures can be affected by body thickness and hydration status of the body. BIA suffers from similar limitations.

To identify low function, several measures have been proposed and are commonly used, including hand grip strength, chair stand, gait speed, 400 meter walk test, timed up and go test, and short physical performance battery. These are acquired to a low cost, but are not muscle specific and hence not sensitive to the aetiology of low function. Factors that can affect these tests are e.g. motivation to perform the test, general fitness level of the patient, neurological causes, pain or arthritis. Further, patients in later stages of their disease might have increasing difficulty performing each of these tests.

Current consensus on sarcopenia is to use a combination of a functional measure and muscle quantity or quality to assess and confirm sarcopenia. A combination is needed to increase the specificity in sarcopenia diagnosis: The aetiology of low muscle strength can e.g. be depression, stroke, balance disorders, or peripheral vascular disorders, and the aetiology of low muscle volume (compared to general population) can simply be a smaller body size.

Consequently, there is a need for a method of evaluating a muscle related condition, such as for sarcopenia, cachexia, muscle degenerative diseases or muscle changes due to e.g. work out or weight loss, which is applicable also to individuals with overweight and obesity, and which is more effective and predictable than previously known methods.

SUMMARY OF THE INVENTION

Magnetic resonance imaging (MRI), together with computed tomography (CT), is considered gold standard for non-invasive assessment of muscle quantity. Body composition profiling is a concept utilizing a standardized MRI examination enabling simultaneous assessment of traditional body composition (total fat-free muscle tissue volume and total adipose tissue volume), as well as detailed characterization of adipose tissue distribution and ectopic fat accumulation, such as visceral adipose tissue (VAT), liver fat and muscle fat infiltration (MFI). Muscle fat infiltration has previously been used as a quantitative measure of muscle quality and is a well-established biomarker in the description of different muscular dystrophies. Assessments of muscle quality are expected by EWGSOP2 to help guide treatment choices and monitor response to treatment in the future.

It is an object of the present invention to provide an improved solution that alleviates the mentioned drawbacks with present methods. Furthermore, it is an object to provide a method for thresholds of individualized, invariant of e.g. BMI, determination of a muscle related condition, such as sarcopenia or cachexia, e.g. identifying abnormally low muscle quantities.

The invention is defined by the appended independent claims, with embodiments being set forth in the appended dependent claims, in the following description and in the drawings.

According to a first aspect of the present invention, a method of evaluating a muscle related condition for a subject individual is provided. The method comprises the steps of acquiring a muscle quantity value of a first muscle for the subject individual; acquiring at least one data parameter value for the subject individual, wherein the data parameter value relates to a quantified parameter of the subject individual's body composition; selecting a number of individuals from a database, wherein the database comprises at least one data parameter value for a plurality of individuals and muscle quantity values of said first muscle for said plurality of individuals, wherein the selection of a number of individuals from the database is based on the at least one data parameter value being compared to the subject individual's at least one data parameter value, thereby creating a virtual control group, VCG, comprising the selected individuals; calculating a prediction value of the muscle quantity values for the individuals in the VCG; and comparing the muscle quantity value for the subject individual to the determined prediction value of the VCG.

The at least one data parameter value may be a value of a parameter selected out of the group of BMI (Body Mass Index), sex, age (e.g. within a range), ethnicity, total amount of fat, total amount of muscle quantity or another weight and/or length related parameter representing the individual's body composition. The type of parameter may be selected in order to provide a basis for the selection of individuals from the database, with the goal of finding individuals similar to the subject individual. In one embodiment, two data parameter values may be acquired for the subject individual, and the database may comprise the corresponding two data parameter values for the individuals therein. Such two parameters may in one embodiment be sex and a body composition representing parameter comprising data about the individual's weight and/or length. In other embodiments, the two parameters may for example be BMI and sex, total amount of fat and sex, total amount of muscle quantity and sex, BMI and total amount of fat, BMI and age, BMI and ethnicity, age and total amount of fat, or BMI and total amount of muscle quantity. When selecting individuals from the database for the VCG using two parameters, a first data parameter may be used first for excluding a portion of the cohort of the database from further selection. A second data parameter may then be used for the non-excluded portion of the database cohort in order to select individuals for the VCG. Such first data parameter may for instance be sex, in which first filtering male individuals are excluded if the subject individual is a female. Among the female individuals in the database, the selection may then be performed using the second data parameter, for instance BMI by comparing the BMI value of the female individuals in the database with the BMI of the subject individual. In further embodiments, more data parameters may be used for selecting individuals from the database to the VCG. For instance, three, four or more data parameters may be acquired for the subject individual, and the database may comprise corresponding three, four or more data parameters for the individuals therein, and the selection of individuals for the VCG may be based on said three, four or more data parameters. As an illustrative example, the selection may be based on sex, ethnicity, age and BMI for the subject individual and the individuals in the database.

The muscle quantity value of the first muscle may further be determinable using an MRI scan and image analysis. I.e. the muscle quantity value of the first muscle may be acquired using a magnetic resonance imaging device. The first muscle may be a thigh muscle since the size of the thigh muscle may be closely related to the body size of the individual.

By muscle quantity it may be meant a quantification of the muscle based on muscle volume, muscle mass, cross sectional area of the muscle, or a combination thereof.

The prediction value may be a value determined based on the muscle quantity values of the first muscle for the selected individuals from the database, which provides a prediction of a common value of the first muscle for the group. Such prediction value may be calculated or modelled in several different ways. The purpose of the prediction value is to provide a numerical representation of the muscle quantity values of the first muscle for the whole group of individuals in the VCG. This representation in the form of the prediction value may then be compared to the muscle quantity value of the subject individual. The prediction value may thereby provide an individual reference value for the subject individual in the determination of a muscle related condition.

By creating a virtual control group using the data parameter value of a data parameter describing the subject individual, the determination using a muscle quantity value of the first muscle may be made with a normalized relationship between the data parameter and the muscle quantity, thereby providing an individualized threshold (the prediction value) adjusted for e.g. body size. Hence, the present invention provides a systematic method to provide reference values for muscle quantity which correct for body size, e.g. length and weight, at the same time. The muscle quantity is thereby normalized with reference to length and weight.

The muscle related condition for which evaluation the present method may provide a basis for, may be any type of muscle degenerative disease, sarcopenia, cachexia, growth disorders, muscle related metabolic diseases, neurological diseases. The present method may further be used to evaluate a work out related condition, such as work out results, rehabilitation measures, or other muscle related change of an individual, such as during weight loss. In any situation, the present method may be used for evaluation of the subject individual's muscle related condition with a normalized reference value that follows different body compositions.

In one embodiment, the prediction value may be a mean value, a median value or a modelled prediction value of the muscle quantity values for the individuals in the VCG. By determining a mean value, median value or a modelled prediction value for the individuals in the VCG, a value predicted to represent a common value of the muscle quantity for the group may be provided. Such determination may provide a prediction value suitable for comparison to the muscle quantity value for the subject individual.

In one embodiment, the muscle quantity value may be a fat free muscle volume (FFMV) value. When evaluating sarcopenia or other muscle related conditions, fat free muscle volume may be a suitable biomarker to use in the evaluation. Further, a fat free thigh muscle volume may be used as biomarker, since the size of the thigh muscle is closely related to the body size, thereby compensating for the body size of the individual.

In one embodiment, the muscle quantity value may represent an effective volume of a first part of the first muscle, said first part having a muscle fat infiltration level below a predetermined threshold level, $T_1$, and wherein the effective volume is determined by multiplying the volume of said first part of the first muscle with $1-(1/T_1)*MFI_1$, wherein $MFI_1$ is the muscle fat infiltration level in said first part of the first muscle. The first muscle may be partly damaged or otherwise non-functional due to a high level of fat infiltration. For the present method, a second part of the muscle having a fat infiltration level above the threshold level may be disregarded when providing a muscle quantity value. The term effective may be used to recognize the volume of the first part of the first muscle as the volume of the muscle that remains effective in terms of function of the muscle. The first part of the first muscle, i.e. the part having a muscle fat infiltration below the threshold level, may be used as basis for the muscle quantity value. For the first part of the muscle, the effective volume is determined based on the muscle fat infiltration in that first part. By multiplying the volume of the first part with $1-(1/T_1)*MFI_1$, an effective volume value may be provided which provides that the entire first part volume is used if there is zero muscle fat infiltration, and towards zero effective volume of the first part when the muscle fat infiltration level increases towards the predetermined threshold. The effective volume of the first muscle may thereby be provided which enables an evaluation based on the remaining function of the first muscle. In one embodiment, the predetermined threshold level of the muscle fat infiltration may be between 30-80%. In a further embodiment, the predetermined threshold level may be between 40-70%. In a further embodiment, the predetermined threshold level may be between 45-55%. In a further embodiment, the predetermined threshold level may be about 50%. The muscle quantity values of the individuals in the database may be muscle quantity values representing corresponding effective volumes of the respective individuals as the muscle quantity value for the subject individual.

In another embodiment, the step of comparing the muscle quantity value of the first muscle for the subject individual to the determined prediction value of the VCG comprises a step of determining a measure of the muscle quantity value's deviation from the prediction value. The dispersion of the muscle quantity value relative to the prediction value may provide a numerical representation of the individual's muscle quantity value deviation from the prediction value. The prediction value providing an individualized reference value for the subject's muscle quantity value, may be used as a basis and the comparison thereto may provide a measure of deviation by the muscle quantity value therefrom. In a further embodiment, said measure of deviation may be the number of standard deviations that the muscle quantity value for the subject individual is below or above the prediction value. When comparing the muscle quantity value of the first muscle for the subject individual to the prediction value, the number of standard deviations which the muscle quantity value is below or above the prediction value may provide an effective analysis of the muscle quantity value's relationship to the prediction value of the VCG. Consequently, this may provide an effective determination or evaluation of the muscle related condition.

In one embodiment, the method may further comprise a step of determining a muscle related condition for the subject individual based on said comparison by determining whether the determined measure of deviation is above or below a predetermined threshold. Depending on the condition for the evaluation, a threshold may be selected at which the outcome of the evaluation may indicated a certain condition.

In a further embodiment, the step of selecting a number of individuals from the database may comprise a step of selecting individuals whose at least one data parameter value is within a predetermined range of the subject individual's data parameter value. The data parameter value for the individuals in the database may be a numeric value, such as for BMI. When selecting individuals for the VCG, the data parameter value of an individual in the database may be compared to the data parameter value of the subject individual, and if the data parameter value of the individual is within a predetermined range, it may be selected for the VCG. The predetermined range may be fixed, or dependent on another parameter of the subject individual, such as sex, age etc. If two or more data parameter values are present and used for the selection, a selection based on a predetermined range of the subject individual's data parameter value may be applied to one of the data parameter values, a portion of the available data parameter values, or all of the data parameter values.

As an example, individuals from the database may be selected for the VCG if having a BMI within ±2 kg/m$^2$ of the subject individual's BMI.

In one embodiment, the step of selecting a number of individuals from the database may comprise a step of extending the range from the subject individual's data parameter value if a predetermined number of individuals fulfilling the criteria has not been found in the database. Following the example above, if the predetermined number of individuals for the VCG has not been reached, the range may be extended in steps by 0.1 kg/m$^2$ until the predetermined number has been reached.

In another embodiment, the method may further comprise a step of acquiring a parameter value of a second biomarker for the subject individual. A second biomarker may improve the evaluation of a muscle related condition. The parameter value of the second biomarker may be used in said evaluation in combination with the result of comparing the muscle quantity value of the first muscle for the subject individual with the prediction value for the VCG. The second biomarker may be a muscle related biomarker for the first muscle. Alternatively, the second biomarker may be a muscle related biomarker for a second muscle or the total muscle quantity. In yet another embodiment, the second biomarker may be a non-muscle related biomarker, such as amount of visceral fat, fat content in an organ etc. The parameter value of the second biomarker may be acquired based on a MRI scan of the subject individual. In one embodiment, the method may comprise a step of performing a MRI scan and the parameter value of the second biomarker may be acquired based on the performed MRI scan. If in an embodiment the muscle quantity value is acquired from a MRI scan, the same MRI scan may be used for acquiring the parameter value of the second biomarker.

In a further embodiment, the parameter value of the second biomarker may be compared with a predetermined threshold value. The parameter value of the second biomarker may be compared to a predetermined threshold value. The threshold value may be fixed, or dependent on a data parameter value of the subject individual, such as sex, weight, BMI, total amount of fat, total muscle quantity etc.

In one embodiment, the comparison of the parameter value of the second biomarker with the predetermined threshold value is combined with the comparison of the muscle quantity value with the prediction value of the VCG. The evaluation of the condition may thereby be performed in a two-dimensional comparison of the muscle quantity and the parameter value of the second biomarker to the prediction value and the predetermined threshold value, respectively. Such operation may provide an effective analysis for evaluation of the subject individual's condition.

In a further embodiment, the second biomarker may be muscle fat infiltration. In an embodiment wherein presence or risk of sarcopenia is determined by the method, the second biomarker may be muscle fat infiltration (MFI), preferably of the same muscle or muscle type as the muscle quantity. By using MFI in combination with muscle quantity or FFMV a more complete description of the composition of the muscle may be provided MFI may further provide additional signs of an unhealthy condition. MFI may also be called intra muscular adipose tissue (IMAT).

In one embodiment, the subject individual's muscle quantity value of the first muscle may be based on a MRI scan of the subject individual. A MRI scan of the subject individual may provide an effective and accurate quantification of the muscle quantity. In order to achieve the muscle quantity value of the first muscle for the subject individual from the MRI scan, any known method of quantifying such biomarker may be used. One such method is disclosed in EP2283376B1. In one embodiment, the method may comprise a step of performing a MRI scan of the subject individual, and the muscle quantity value may be acquired from the MRI scan. Correspondingly, what is said above for the muscle quantity value may also applied for the parameter value of the second biomarker.

According to a second aspect of the invention, a system is provided which comprises means configured to perform the method according to any of the embodiments above. Such means may be a computer configured to perform said method. The computer may be provided with a computer program product configured to execute said method.

According to a third aspect of the invention, an evaluation device configured to evaluate a muscle related condition for a subject individual is provided, the evaluation device comprising an acquiring means configured to acquire a muscle quantity value of a first muscle for the subject individual, wherein the muscle quantity value represents an effective volume of a first part of the first muscle, said first part having a muscle fat infiltration level below a predetermined threshold level, $T_1$, wherein the effective volume is determined by multiplying the volume of said first part of the first muscle with $1-(1/T_1)*MFI_1$, wherein $MFI_1$ is the muscle fat infiltration level in said first part of the first muscle, and wherein the data parameter value relates to a quantified parameter of the subject individual's body composition; a selection means configured to select a number of individuals from a database, wherein the database comprises at least one data parameter value for a plurality of individuals and muscle quantity values of said first muscle for said plurality of individuals, wherein the selection of a number of individuals from the database is based on the at least one data parameter value being compared to the subject individual's at least one data parameter value, thereby creating a virtual control group, VCG, comprising the selected individuals; a calculation means configured to calculate a prediction value of the muscle quantity values for the individuals in the VCG; and a comparison means configured to compare the muscle quantity value for the subject individual to the determined prediction value of the VCG. The different means in the evaluation device may in one embodiment be provided by respective acquiring unit, selection unit, calculation unit and comparison unit. These units may be provided in one or more computer units or processing units.

BRIEF DESCRIPTION OF THE DRAWINGS

The invention will in the following be described in more detail with reference to the enclosed drawings, wherein.

DESCRIPTION OF EMBODIMENTS

Figure 1:
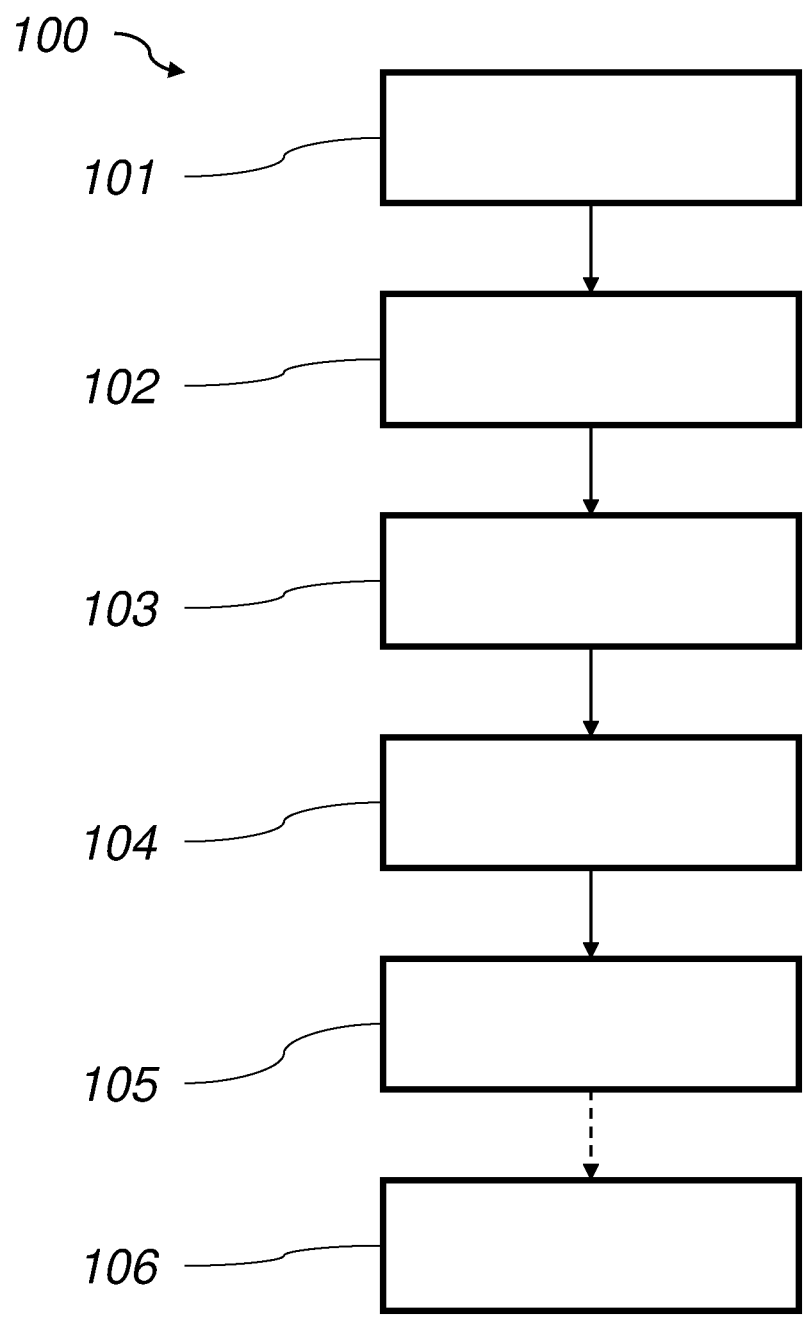
FIG. 1 shows a flow chart diagram of a method according to an embodiment of the present invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

FIG. 1 illustrates a summary of the disclosed method 100 of evaluating a muscle related condition for a subject individual. The method 100 comprises a step of acquiring 101 a muscle quantity value of a first muscle for the subject individual. This may for instance be a Fat Free Muscle Volume (FFMV) value for the subject individual's thigh muscle. Further, at least one data parameter value is acquired 102, which data parameter value provides a quantified parameter of the subject individual's body composition. Such data parameters may for instance be sex and BMI. Next, a selection 103 of individuals is made from a database comprising at least one parameter data value for a plurality of individuals and muscle quantity values of said first muscle for the plurality of individuals. The data parameter(s) for which values are present in the database for the individuals therein is preferably the same data parameter(s) as acquired for the subject individual. Out of the plurality of individuals in the database, a number of individuals are selected based on at least one data parameter value of the data parameter being compared to the subject individual's at least one data parameter value. A virtual control group, VCG, for the subject individual is thereby created. After creating the VCG, a prediction value of the muscle quantity values of the first muscle for the individuals in the VCG is determined 104. The prediction value is used for comparing 105 the muscle quantity value for the subject individual to. This comparison 105 may provide the evaluation of a muscle related condition for the subject individual. Hence, a determination 106 of the condition for the subject individual may be made.

Figure 2:
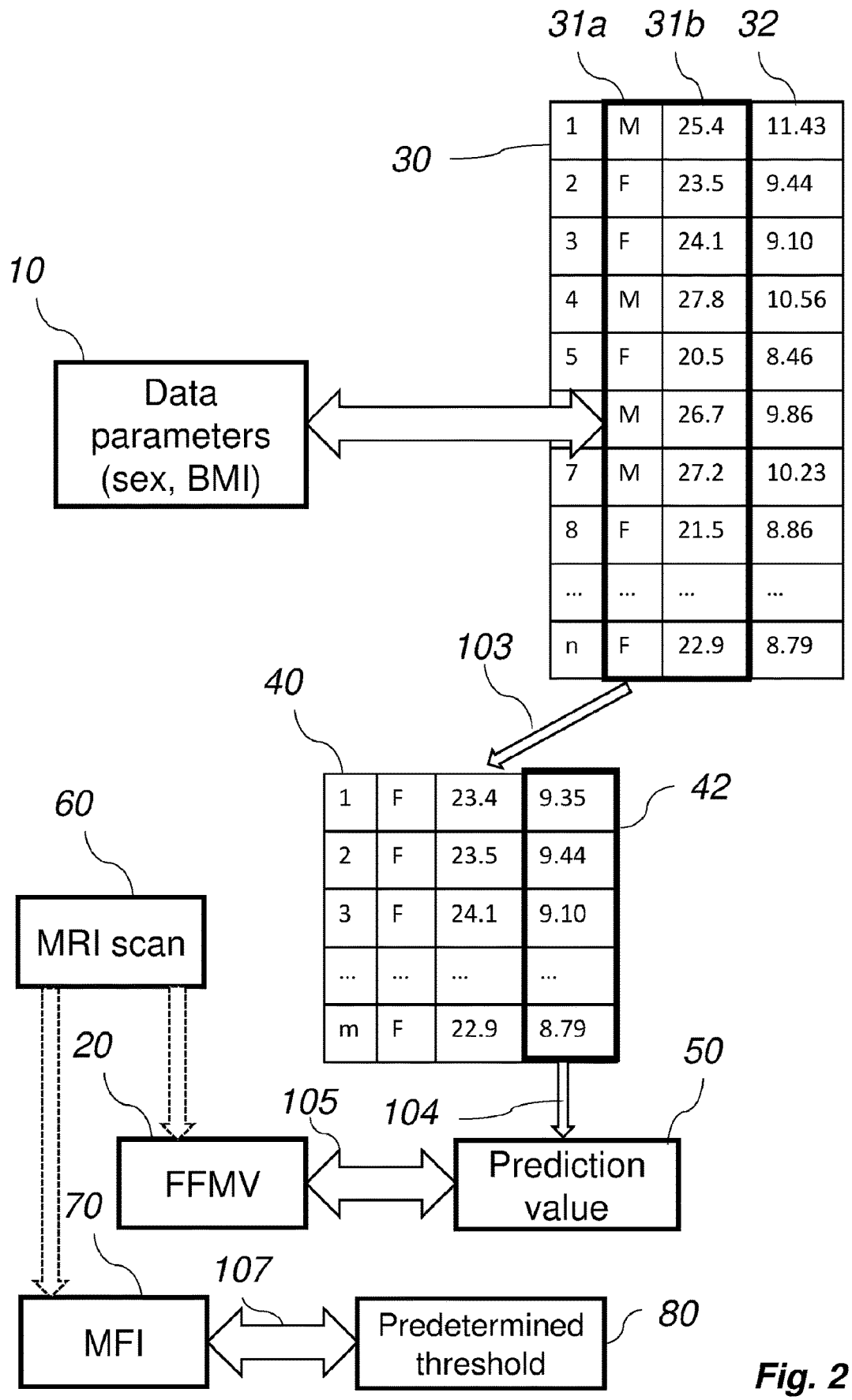
FIG. 2 shows a block diagram of a method according to an embodiment of the present invention.

FIG. 2 further exemplifies an embodiment of the present invention. Two data parameters 10, sex and BMI, for the subject individual are provided. These values are compared to corresponding data parameter values 31a, 31b for a number n individuals in a database 30. The data parameter 31a indicates the sex (Male or Female) of the individuals in the database 30. The database 30 further comprises muscle quantity values 32 for each individual therein. Based on the comparison between the data parameters 10 of the individual and the data parameters 31a, 31b of the individuals in the database 30, a selection 103 is made to form the virtual control group, VCG, 40 comprising m individuals selected out of the n individuals in the database 30. For the individuals in the VCG 40, the muscle quantity values 42 are used to calculate 104 a prediction value 50. The prediction value 50 may as an example be a mean value of the muscle quantity values 42 in the VCG 40. Finally, the prediction value 50 is compared to the muscle quantity value (e.g. a fat free muscle volume, FFMV, value) 20 of the subject individual. Thereby, an evaluation of the subject individual's muscle related condition is provided, in which an individualized threshold is provided and thereby normalizes the evaluation in relation to the body size of the subject individual.

The muscle quantity value 50 of the subject individual may be acquired from a MRI scan 60 providing a quantified value of the muscle. The data parameters 10 of the subject individual are typically acquired from previous data or measurements.

The evaluation may further comprise additional steps of acquiring a second biomarker value, here exemplified as a muscle fat infiltration, MFI, value 70, and comparing 107 this value with a predetermined threshold 80. This may provide an increased efficiency and accuracy in the evaluation of the subject individual's muscle related condition, especially when combined with the muscle quantity value comparison using an individualized threshold.

Figure 3:
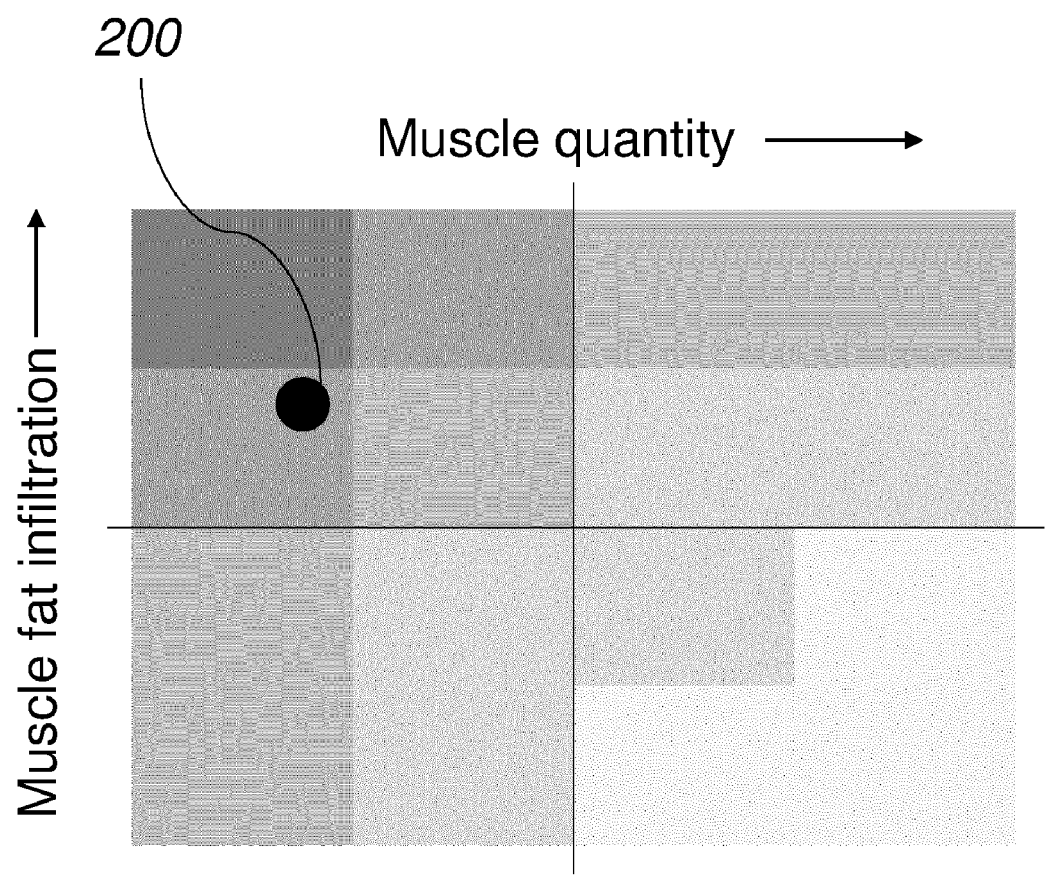
FIG. 3 shows diagrams of the coupling of $FFMVi_{VCG}$ and MFI and their distributions.

FIG. 3 illustrates an evaluation using the combined comparisons 105, 107 of the muscle quantity value 50 with the prediction value and the MFI value 70 with the predetermined threshold 80. The diagram may be used to visualize the subject individual's muscle related condition 200 based on the evaluation.

In the following, a method is described in the embodiment of determining presence of sarcopenia, using Fat Free Muscle Volume, FFMV, as biomarker for the subject individual. Included is also a discussion as to the outcome of such method compared to previously known muscle assessments used for determination of low muscle quantities to see the correlation between the methods. Note that another representation of the muscle quantity than FFMV may be used also in this embodiment as discussed above.

To provide basis for sarcopenia determination with individualized sarcopenia thresholds identifying abnormally low muscle volumes, a virtual control group, VCG, is created for the subject individual, and the index FFMV/height$^2$ (FFMVi) is used. The virtual control group is created by applying a filter stratifying individuals of the same sex and within ±2 kg/m$^2$ of the subject individual's BMI. If the application of this filter do not result in 150 selected individuals for the VCG, the BMI interval can symmetrically and incrementally be increased by steps of 0.1 kg/m$^2$ until at least 150 virtual controls were stratified. To measure the degree to which each subject individual deviate from its predicted FFMVi, an individual FFMVi z-score (number of standard deviations (SDs) from mean value (prediction value)) is calculated from the VCG distribution. This is referred to as FFMVi$_{VCG}$. The application of a threshold to FFMVi$_{VCG}$ can be compared to that of FFMVi by investigating the functional performance of those individuals failing a muscle assessment within sex-specific BMI classes. The basis for individualized sarcopenia thresholds identifying low muscle volumes is created by presenting the FFMVi values corresponding to different number of SDs below the mean for a range of BMI values.

To put FFMVi$_{VCG}$ in the context of other body size adjustments of muscle measurements commonly used to assess muscle quantity for sarcopenia detection, its association to BMI can be compared to how ASM/height$^2$ (Appendicular Skeletal Muscle Mass, ASM), ASM/weight, ASM/BMI, FFMVi, FFMV/weight, and FFMV/BMI are associated to BMI.

Combined Muscle Assessment for Sarcopenia
Combined Muscle Assessment and Ageing

To investigate the relation between FFMVi$_{VCG}$ and Muscle Fat Infiltration (MFI) and age, their association to age can be compared to that of ASMi, FFMV, FFMVi, ASMi/BMI, FFMV/BMI, and FFMVi/BMI, through visualization and calculation of 5-year difference in mean and 5-year effect size.

Combined Muscle Assessment, Health Care Burden and Functional Outcomes

To further assess the potential value of a combined muscle assessment for sarcopenia, including both FFMV and MFI, MFI can be investigated as a potential biomarker for muscle quality predicting function and mobility. The investigation includes the following variables:

Health care burden, defined as number of hospitalization nights within 10 years prior to scanning, excluding pregnancy related nights (ICD10-codes under O and P), and truncated at 30 nights.

Hand grip strength, comparing subjects below, to subjects above sex-specific thresholds used for sarcopenia detection (thresholds females/males: 16/27 kg). Measures of hand grip strength below 10 kg for the right/left hand may be removed. The hand grip strength used for analysis was that of the hand reported as dominant. If no information of handedness is present, the mean of the right and left hand can be used.

Usual walking pace, comparing subjects that reported 'Slow pace' to those that reported 'Steady average pace' or 'Brisk pace'.

Stair climbing, comparing subjects that reported a frequency of stair climbing (approximately 10 steps) during a day of 0 to those that reported climbing 1 or more stairs a day.

Number of falls, comparing subjects that reported more than 1 fall the last year to those that reported no falls. Subjects that reported only 1 fall can be excluded from analysis (N=1,223).

Multivariable logistic regression modelling can be performed using FFMVi$_{VCG}$ and MFI as predictors. Due to the wide range of diseases and complications included in the measure for health care burden, abdominal fat distribution (described by VAT and ASAT) can also be included as predictors. The models are further corrected for sex and age. The association between health care burden and body composition is investigated in the full cohort (N=9,615), among subjects below the ASMi thresholds for sarcopenia detection (N=797), and among subjects below the hand grip strength thresholds for sarcopenia detection (N=612). This analysis can also be repeated using FFMVi instead of FFMVi$_{VCG}$.

The multivariable logistic regression models for predicting hand grip strength, usual walking pace, stair climbing, and number of falls includes only MFI and FFMVi$_{VCG}$, and is corrected for sex, age, and BMI.

Detecting Low Functional Performance Through Combined Muscle Assessment

To investigate the value of combined muscle assessment measuring both FFMV and MFI, the fitted values for prediction of the 4 functional outcomes above (failing of hand grip strength test, slow usual walking pace, no stair climbing, and more than one fall last year) can be extracted from 4 logistic regressions using the following predictors: (1) FFMVi, (2) FFMVi$_{VCG}$, (3) MFI, (4) FFMVi$_{VCG}$ and MFI. The fitted values are used as predictors in receiver operator characteristic (ROC) analysis, and the area under the ROC curves (AUCs) and corresponding confidence intervals are calculated for comparison of diagnostic performance.

Sarcopenia Thresholds for Combined Muscle Assessment

To provide basis for threshold application for sarcopenia detection based on combined muscle assessment. The fraction of subjects within females/males with FFMVi$_{VCG}$ and MFI values below different thresholds, together with the fraction of subjects with low functional performance (i.e. low hand grip strength, slow walking pace, no stairs climbed, and more than one fall last year) in those groups is calculated. The threshold values for FFMVi$_{VCG}$ is translated to FFMVi values per BMI value.

The present method is further exemplified below using results of a performed study.

Subjects

Table 1 summarizes the characteristics of the full cohort, females and males separately.

Muscle Quantity Assessment in Sarcopenia

The fraction of subjects failing the muscle assessment (ASM/height$^2$ assessed by DXA), the hand grip strength test, and the combination of the two in different BMI classes are shown in Table 2. The number of subjects failing the muscle assessment decreased as BMI increased: within subjects with obesity 0.0% of the females, and 0.2% of the males failed compared to 11.1% and 36.8% in normal weight females and males.

Individualized Muscle Volume Assessment

Figure 4:
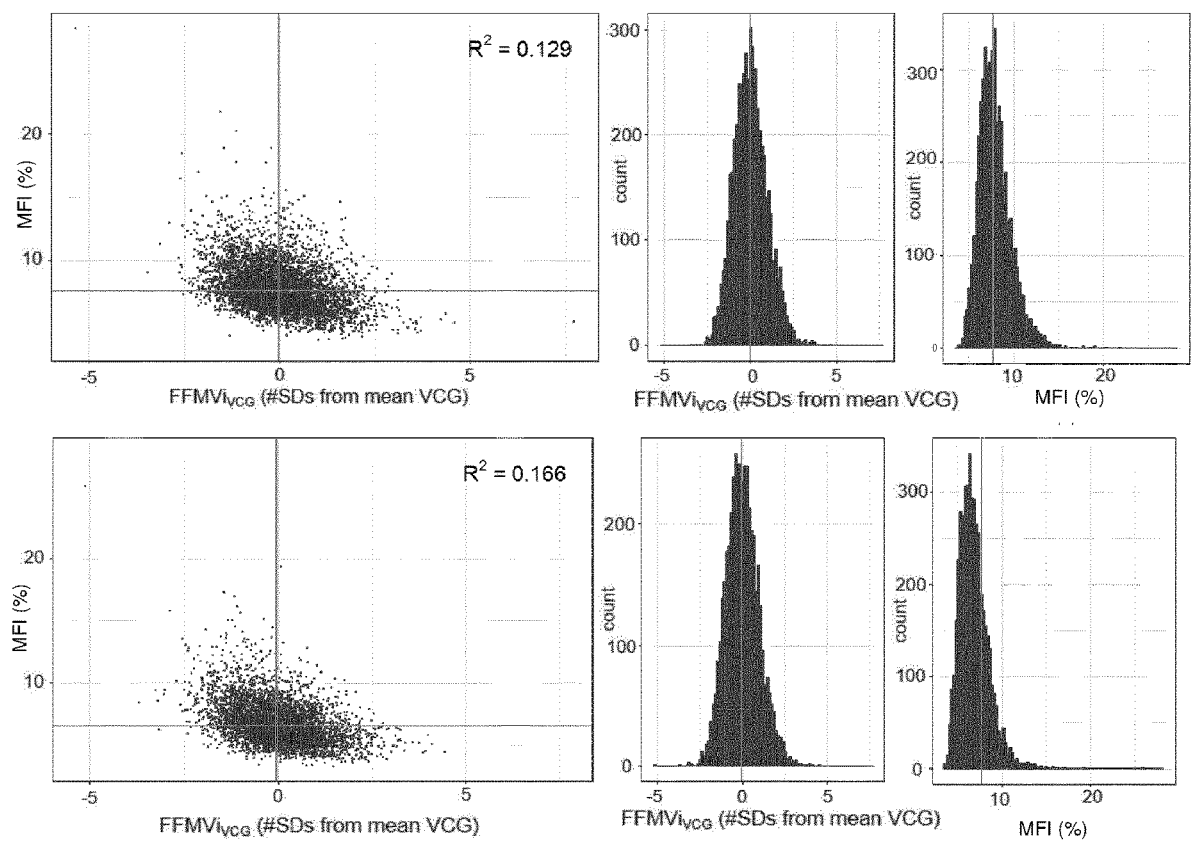
FIG. 4 the implications of a threshold application to FFMVi compared to $FFMVi_{VCG}$ on the fraction of subjects failing muscle assessment within sex-specific BMI classes.

FIG. 4 shows the coupling of FFMVi$_{VCG}$ and MFI and their distributions. The coefficient of determination ($R^2$) for FFMVi$_{VCG}$ and MFI was 0.13/0.17 for females/males.

Figure 5:
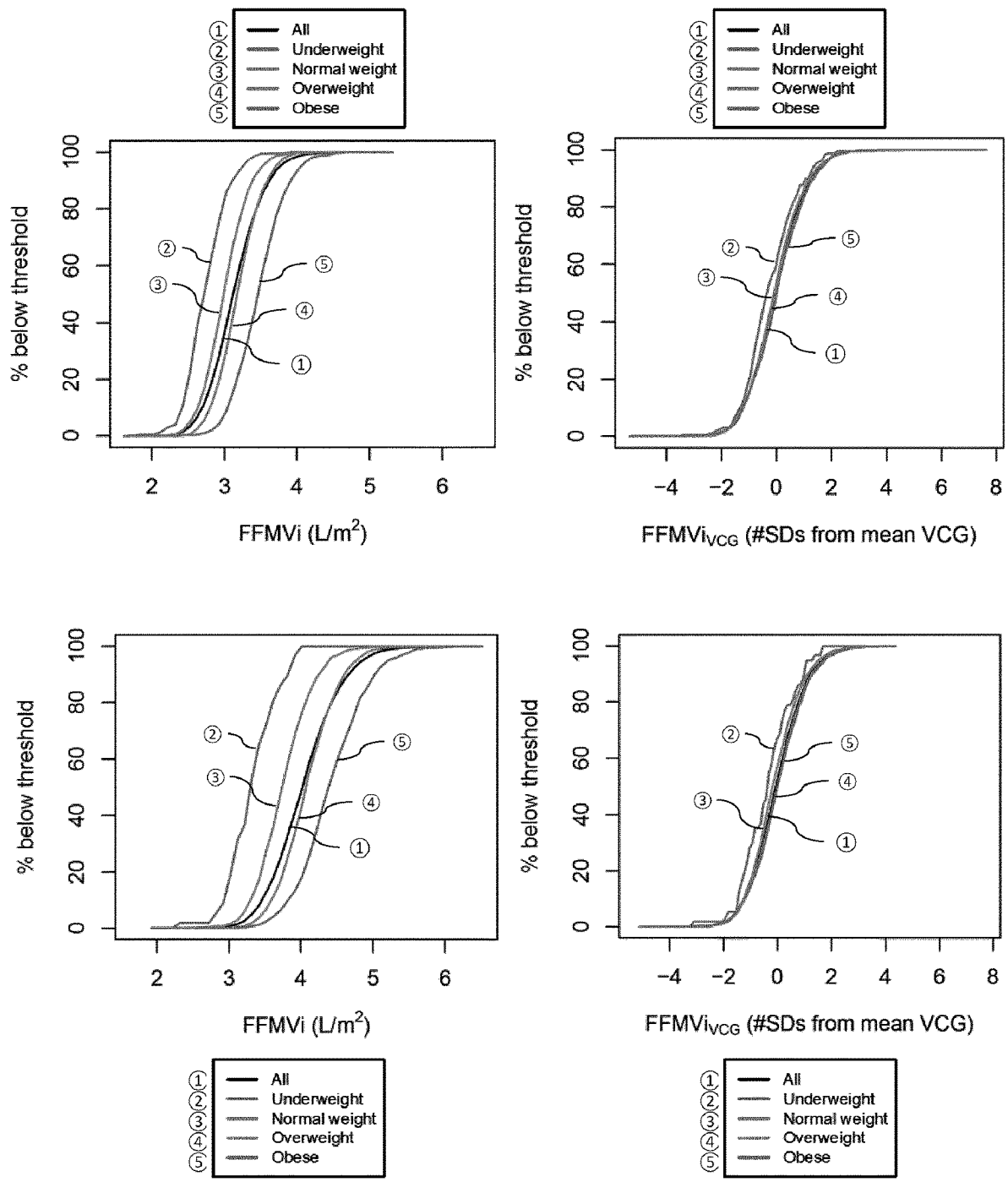
FIG. 5 shows the association between $FFMVi_{VCG}$ and BMI in comparison to other body size adjustments commonly used to assess muscle quantity for sarcopenia detection.

FIG. 5 shows the implications of a threshold application to FFMVi compared to FFMVi$_{VCG}$ on the fraction of subjects failing muscle assessment within sex-specific BMI classes. Threshold application to FFMVi results in different percentages of subjects stratified depending on BMI class, whereas the percentage of subjects stratified by threshold application to FFMVi$_{VCG}$ was independent of BMI class.

Figure 6:
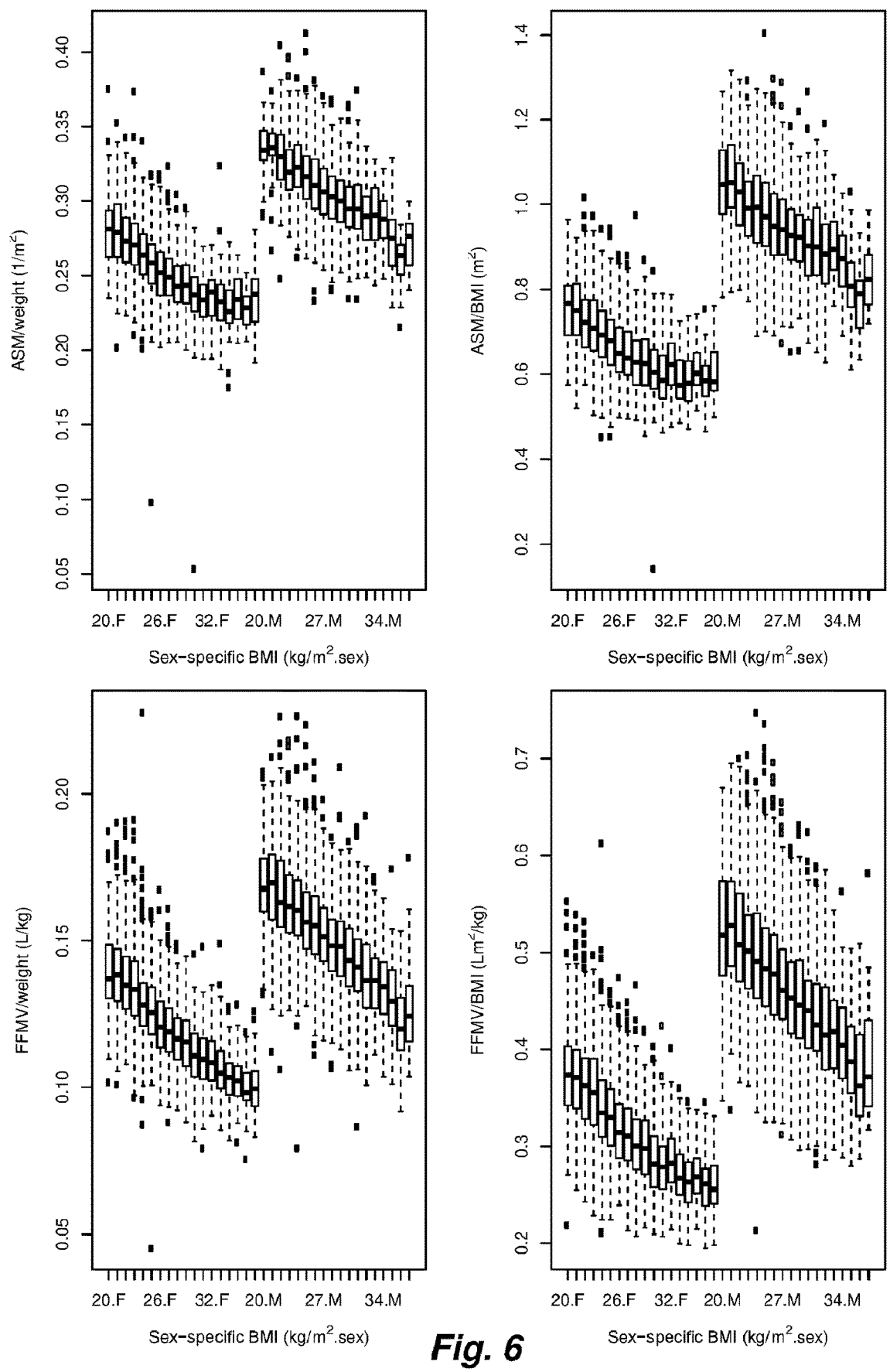
FIG. 6 shows the relation between $FFMVi_{VCG}$ and MFI and age, in comparison to that of ASMi, FFMV, FFMVi, ASMi/BMI, FFMV/BMI, and FFMVi/BMI.
Figure 6:
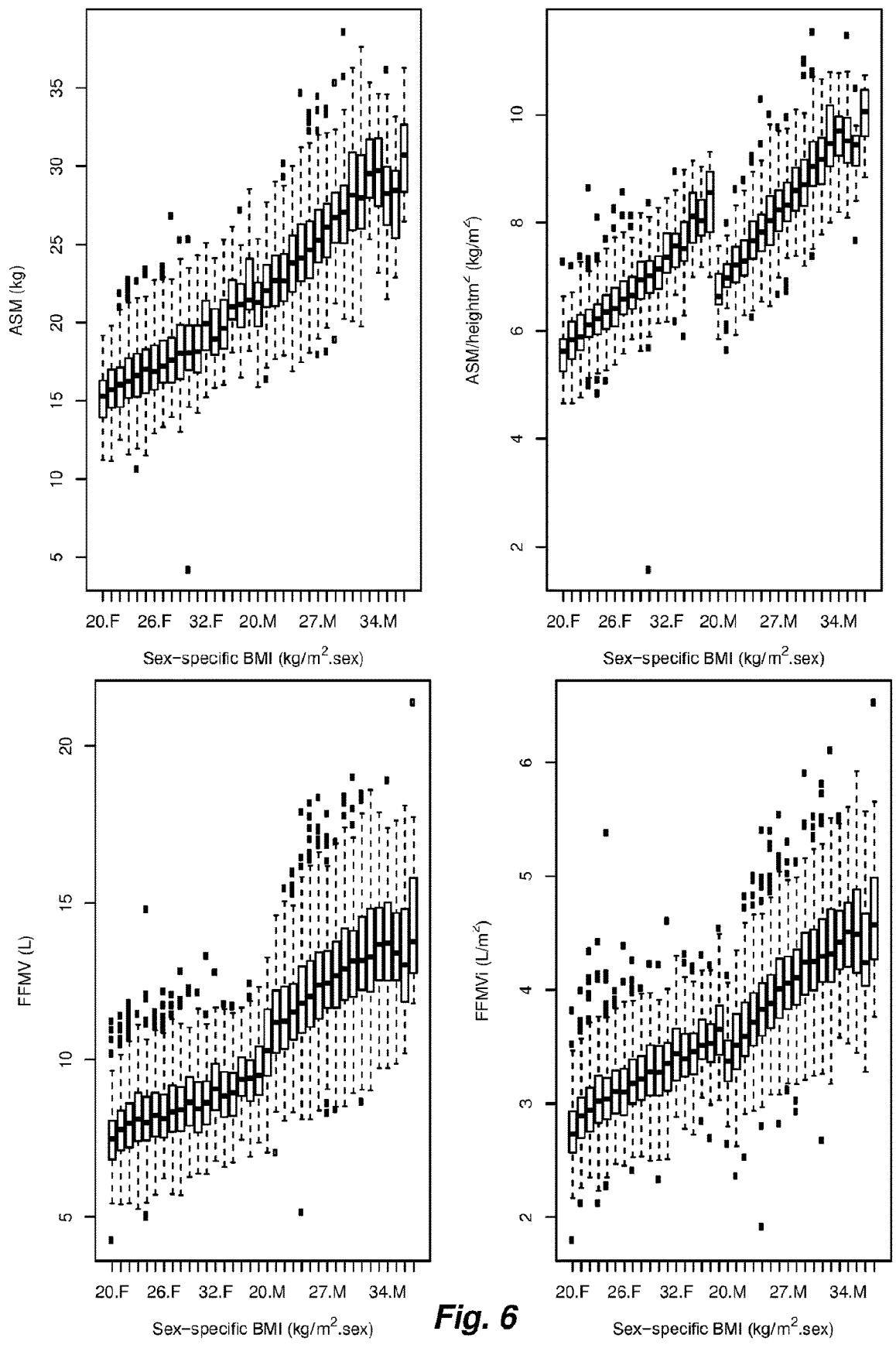
Figure 6:
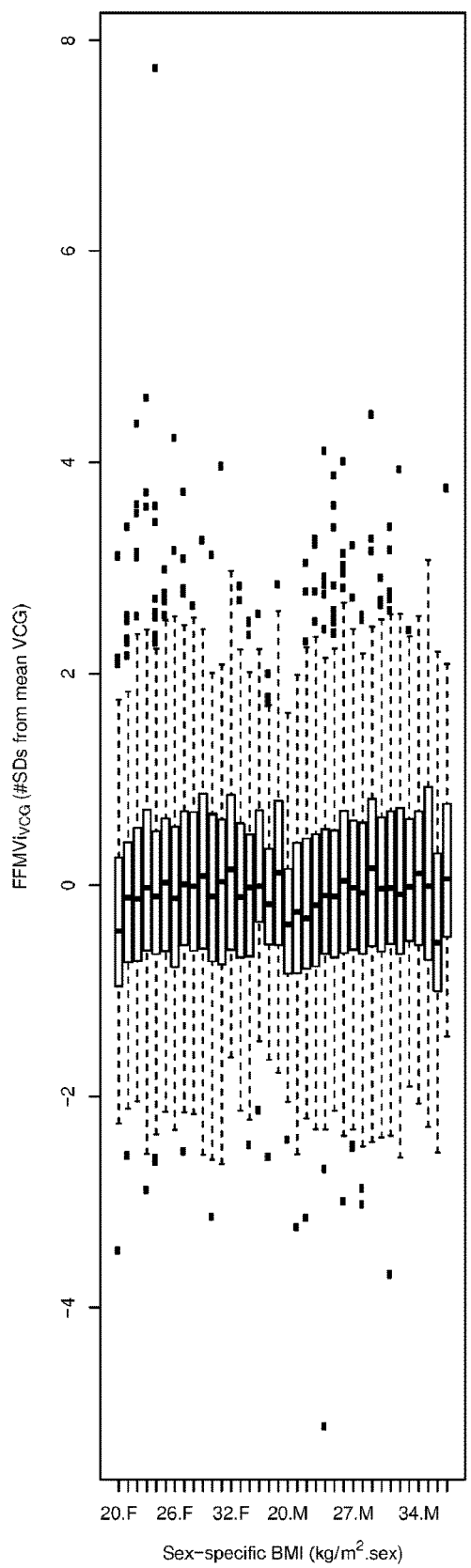

FIG. 6, with corresponding $R^2$ values in Table 3, shows the association between FFMVi$_{VCG}$ and BMI in comparison to other body size adjustments commonly used to assess muscle quantity for sarcopenia detection. For females, the correlation between ASM and weight or BMI was of 1.7 and 2.4 times higher magnitude than the correlation between FFMV and weight or BMI respectively. Adjusting ASM for ASM/height$^2$ resulted in a correlation to BMI of larger magnitude ($R^2$=0.640) than what was originally observed between ASM and BMI ($R^2$=0.378). ASM/weight introduced a negative correlation to BMI, also with larger magnitude ($R^2$=0.397) than originally observed, and ASM/BMI introduced a negative correlation of similar magnitude ($R^2$=0.315). The application of virtual control groups resulting in FFMVi$_{VCG}$ effectively normalized the association between muscle volume and BMI ($R^2$=0.002/0.006 (females/males).

Combined Muscle Assessment for Sarcopenia

Combined Muscle Assessment and Ageing

Figure 7:
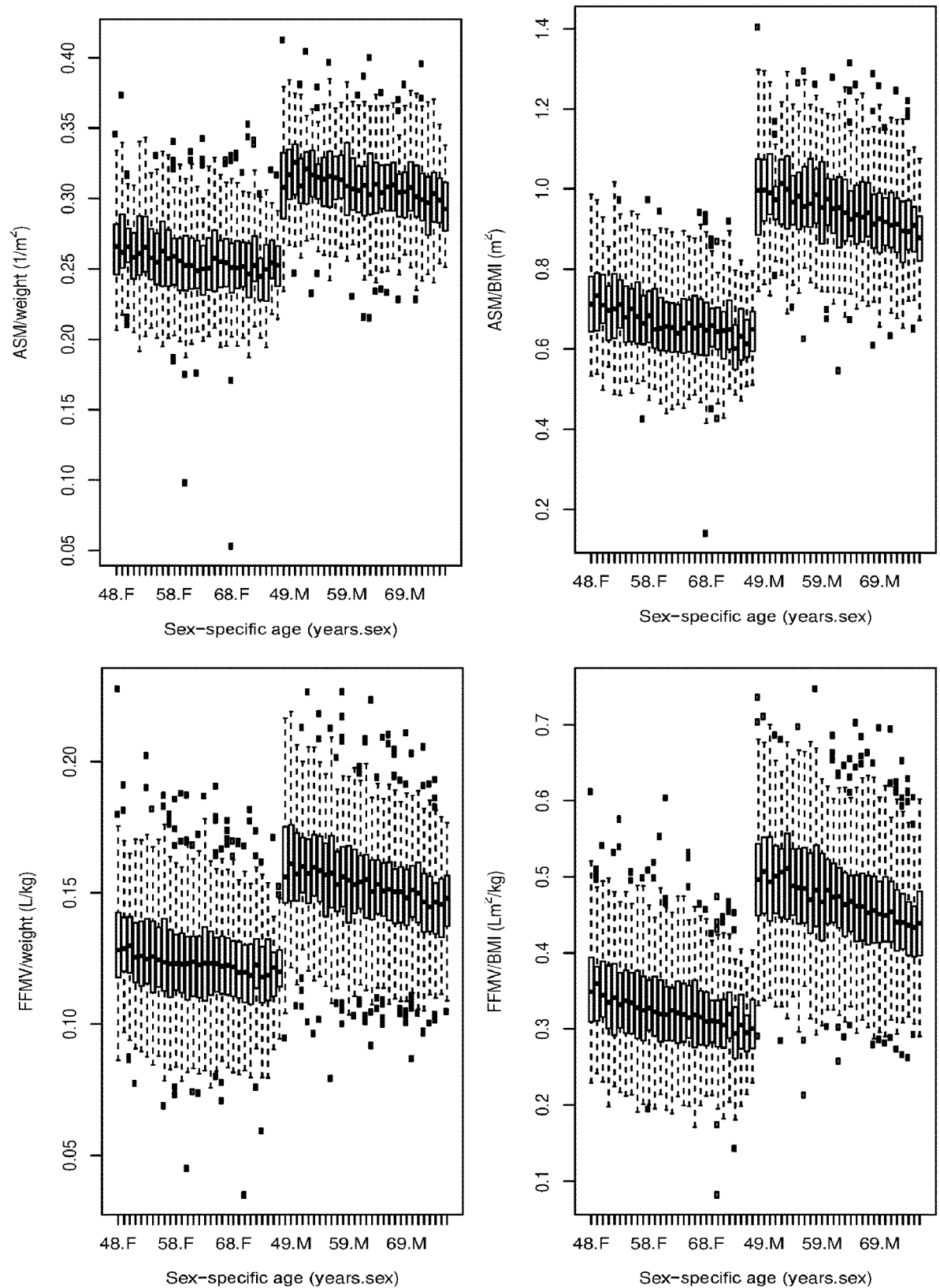
FIG. 7 shows the relation between $FFMVi_{VCG}$ and MFI and age, in comparison to that of ASMi, FFMV, FFMVi, ASMi/BMI, FFMV/BMI, and FFMVi/BMI.
Figure 7:
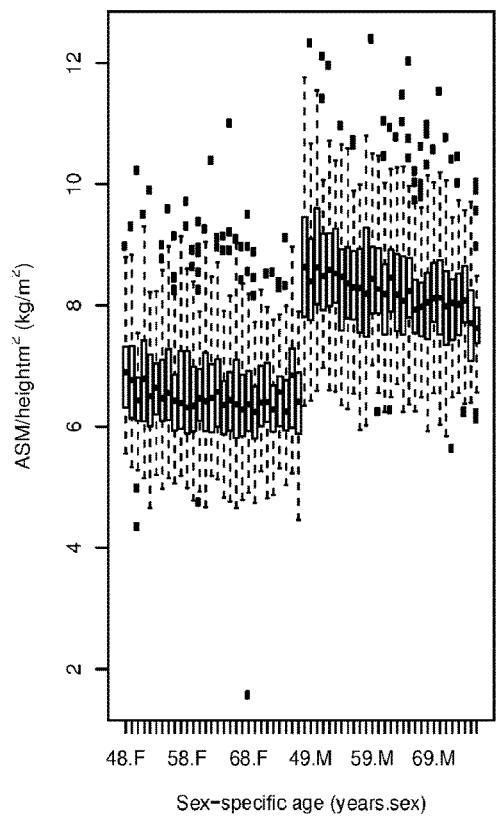
Figure 7:
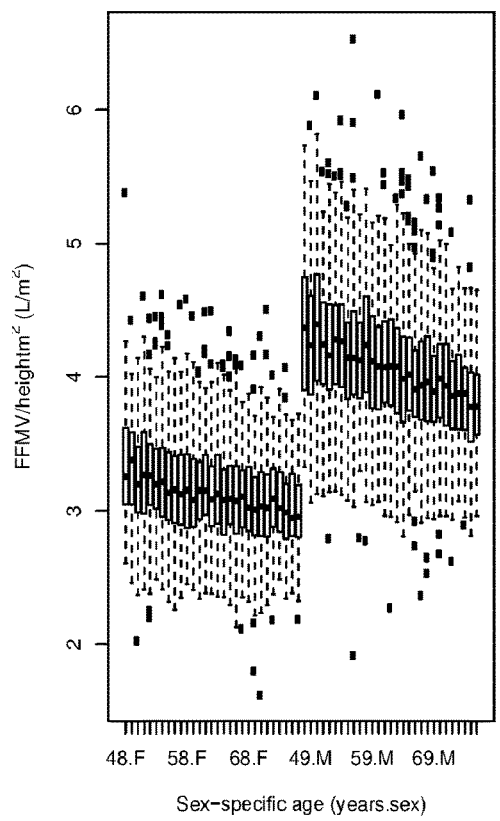
Figure 7:
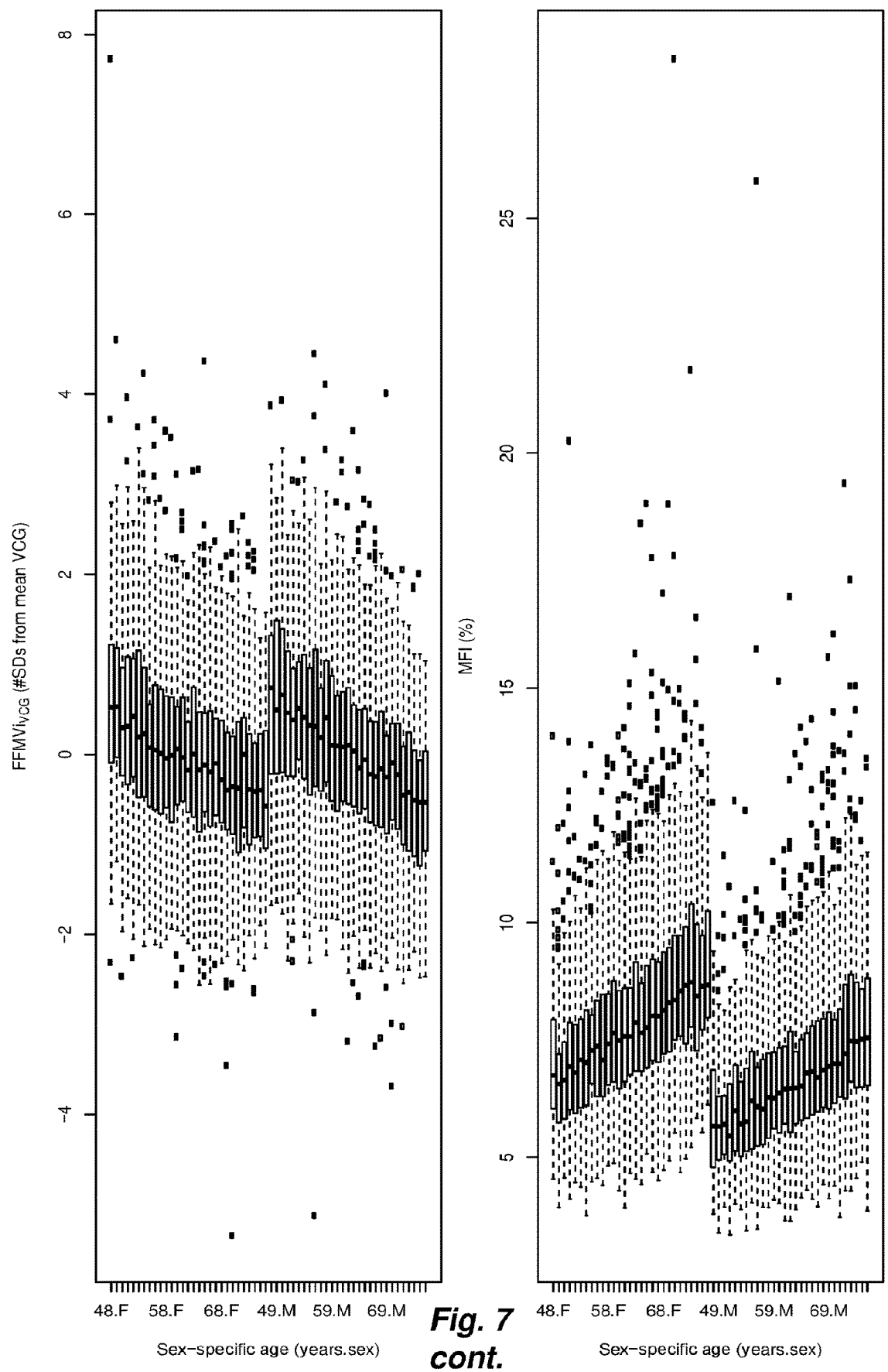

FIG. 7 shows the relation between FFMVi$_{VCG}$ and MFI and age, in comparison to that of ASMi, FFMV, FFMVi, ASMi/BMI, FFMV/BMI, and FFMVi/BMI. FFMVi$_{VCG}$ showed a negative association to age with an average 5-year difference of −0.19 SDs from mean VCG, between ages 47-77 years. MFI showed a positive association to age with an average 5-year difference of 0.40 pp. The 5-year difference in mean with corresponding SDs and 5-year effect size can be found in Table 4. The 5-year effect size of FFMV was slightly increased when adjusting by application of virtual control groups (FFMVi$_{VCG}$) and highest 5-year effect size was found for MFI.

Combined Muscle Assessment and Health Care Burden

The results from the statistical modelling of health care burden can be found in Table 5. A higher MFI was significantly associated with a higher health care burden for all groups (whole cohort and subjects with low ASMi ($p<0.001$), and subjects with low hand grip strength ($p<0.05$)). A lower FFMVi$_{VCG}$ was significantly associated with higher health care burden for the whole cohort ($p<0.01$) and subjects with low ASMi ($p<0.05$). For subjects with low hand grip strength, the association between FFMVi$_{VCG}$ and health care burden was non-significant. The association between VAT and health care burden was positive for the whole cohort ($p<0.05$), negative for subjects with low ASMi ($p<0.05$), and non-significant for subjects with low hand grip strength. The association with ASAT was non-significant for all groups. The models including FFMVi instead of FFMVi$_{VCG}$ showed that a higher MFI was significantly associated with higher health care burden for all groups (whole cohort and subjects with low ASM/height$^2$ ($p<0.001$), and subjects with low hand grip strength ($p<0.01$)). The association between FFMVi and health care burden was significant only for subjects with low ASMi. The associations between health care burden and VAT and ASAT remained.

Combined Muscle Assessment and Functional Outcomes

The results from the multivariable statistical modelling investigating the remaining functional outcomes (hand grip strength, stair climbing, walking pace, and number of falls) can be found in Table 6. The associations between FFMVi$_{VCG}$ and hand grip strength, stair climbing, and walking pace are significant within the whole cohort, and females and males separately. The association between FFMVi$_{VCG}$ and number of falls was non-significant within all groups. The associations between MFI and all functional outcomes are significant within all groups with exception of the males, where the association with stair climbing and number of falls are non-significant.

Detecting Low Functional Performance Through Combined Muscle Assessment

Results from the ROC analysis using FFMVi, FFMVi$_{VCG}$ and MFI separately, as well as FFMVi$_{VCG}$ and MFI combined, as predictors for low functional performance is presented in Table 7. The diagnostic performance using FFMVi$_{VCG}$ instead of FFMVi as predictor is higher for all functional outcomes and within all groups (whole cohort, females, and males). The diagnostic performance using MFI in comparison to FFMVi$_{VCG}$ is higher for stair climbing and number of falls within all groups, of the same magnitude for walking pace, and slightly lower for hand grip strength. For all functional outcomes, the combined use of FFMVi$_{VCG}$ and MFI for detection of subjects with low functional performance resulted in the highest diagnostic performance.

Sarcopenia Thresholds for Combined Muscle Assessment

The fraction of subjects within females/males with FFMVi$_{VCG}$ and MFI values below different thresholds, together with the fraction of subjects with low functional performance in those groups can be found in sex-specific Tables 8-11. The lookup table for FFMVi values per sex and BMI value corresponding the FFMVi$_{VCG}$ thresholds in Table 12.

CONCLUSION

The presented method provided basis for BMI invariant muscle quantity assessment for sarcopenia detection and discloses the value of combined muscle assessment (fat-free volume and fat infiltration) performed through MRI and advanced image analysis techniques for segmentation and quantification. Three key findings from the above may be provided. First, the application of virtual control groups, resulting in FFMVi$_{VCG}$, effectively normalizes the association between muscle volume and BMI ($R^2$=0.002/0.006 (females/males)). Second, muscle fat infiltration (MFI) and virtual control-based fat-free muscle volume ($FFMVi_{VCG}$) is very vaguely correlated ($R^2$=0.13/017 (females/males), and separately predicted hospitalization, muscle function (hand grip strength), and mobility function (stair climbing, walking pace, and number of falls). And lastly, the combination of $FFMVi_{VCG}$ and MFI improved the functional link between imaging biomarkers and functional outcome with highest diagnostic performance utilizing the combination of the two for prediction of low function.

The above provides that none of the previously proposed adjustments (division by height$^2$, weight, or BMI) efficiently normalizes the correlation between muscle quantity (ASM or FFMV) and body size (Table 3). In fact, in a large population study, ASM/height$^2$ efficiently normalizes the association between ASM and height, but at the same time introduced a correlation to BMI ($R^2$=0.640) of larger magnitude than what was originally observed between ASM and BMI ($R^2$=0.378). Further, the other two adjustments (division by weight or BMI) introduces negative correlations to BMI, with larger or similar magnitude than originally observed. Few, if any, previous studies on sarcopenia have controlled whether their application of these adjustments actually normalizes the measured muscle quantity for body size as intended, which might have caused misinterpretation of results. The low correlation between $FFMVi_{VCG}$ and height, weight, and BMI, in the context of other suggested adjustments (Table 3), shows an effective normalization of body size. The reason for the effectiveness of $FFMVi_{VCG}$ is that it takes the specific distribution of FFMVi for each BMI value into account when adjusting the muscle measurement. This enables BMI invariant assessment for sarcopenia detection, opening up the possibility to properly assess sarcopenia in overweight and obesity.

In addition to the effective body size normalization achieved by application of virtual control groups by the present method, the adjustment of FFMV (resulting in $FFMVi_{VCG}$) strengthens the link between FFMV and both hospitalization and functional outcomes, indicating a higher clinical relevance of assessing the degree to which the individual deviates from their expected muscle volume instead of using the muscle volume measured directly and comparing to population based thresholds. The rationale behind adjusting muscle volume for body size is the fundamental correlation between the two caused by the natural response of the body to increase muscle volume as a reaction to increased body weight—more muscles are needed to carry the body and the increase in muscle volume enables the individual to better maintain their mobility and function during weight gain. Although there also is a correlation between MFI and BMI, MFI is not adjusted for body size in this study. The reason is that higher MFI (potentially caused by weight gain) is, in contrast to higher muscle volume, associated with lower function and poor outcome.

MFI very vaguely correlated with $FFMVi_{VCG}$ (FIG. 4) and shows differentiation in results from the multivariable statistical modelling of hospitalization and functional outcomes. Most notable are the association to number of falls, where the association to $FFMVi_{VCG}$ is non-significant whereas MFI was positively associated to having more than 1 fall (Table 6), and that in subjects with low hand grip strength, only MFI was predictive of hospitalization (Table 5). The coupled description of decrease in muscle volume and increase in MFI in the aging population offers a more complete, muscle-specific, picture of functional decay.

That virtual control group-adjusted FFMV and MFI separately predicted hospitalization, low muscle function (hand grip strength), and low mobility function (stair climbing, walking pace, and number of falls) (Tables 5 & 6) indicated that there is additional value in measuring MFI as a descriptor for muscle quality in addition to muscle volume. This is further strengthened by the results on diagnostic performance for predicting functional outcomes (Table 7), where the combination of $FFMVi_{VCG}$ and MFI resulted in higher diagnostic performance for all outcomes (although not all significant), as compared to using only FFMVi or $FFMVi_{VCG}$.

Combined muscle assessment for sarcopenia (quantification of MFI and $FFMVi_{VCG}$) can be performed using a 6-minute MRI scan coupled with automated image analysis, e.g. including quantification of visceral fat, subcutaneous fat, and liver fat, allowing complete wasting assessment. Today, this is a solution available also outside the image processing research community. Such assessment results in quantifiable, muscle-specific, imaging biomarkers with a direct link to functional outcomes that might allow objective sarcopenia assessment. The standardization and high accuracy and precision enable close tracking of longitudinal changes and comparison over, and between, large cohorts. However, today MRI is not readily available to detect sarcopenia at population scale and is not suitable as first assessment for potential sarcopenia. Screening is needed to decide what patients might benefit from an MRI examination for detection and tracking of sarcopenia progression.

In this above, the basis for individualized thresholds to identify individuals with a low muscle function due to abnormally low muscle volumes and poor muscle quality is provided. This is done by presenting sex-specific tables for $FFMVi_{VCG}$ and MFI linking a range of threshold values to functional outcomes (Tables 8-11). Since $FFMVi_{VCG}$ are body size adjusted FFMV values, a lookup table showing what each $FFMVi_{VCG}$ threshold value correspond to in FFMV (per BMI value) is also provided (Table 12). This enables the usage of Tables 7 & 9 without having to apply the virtual control group adjustment to acquired FFMV values.

In the drawings and specification, there have been disclosed preferred embodiments and examples of the invention and, although specific terms are employed, they are used in a generic and descriptive sense only and not for the purpose of limitation, the scope of the invention being set forth in the following claims.

TABLES

TABLE 1

Characteristics summarization of the full cohort, females and males separately.
For continuous variables, mean and standard deviation is shown.

|  | All | Females | Males |
| --- | --- | --- | --- |
| N subjects | 9,615 | 5,046 | 4,569 |
| Age, years | 62.60 (7.50) | 61.87 (7.34) | 63.41 (7.59) |
| Weight, kg | 75.55 (14.77) | 68.68 (12.91) | 83.14 (12.84) |

TABLE 1-continued

Characteristics summarization of the full cohort, females and males separately.
For continuous variables, mean and standard deviation is shown.

|  | All | Females | Males |
|---|---|---|---|
| Height, m | 1.69 (0.09) | 1.63 (0.06) | 1.76 (0.06) |
| BMI, kg/m$^2$ | 26.64 (4.37) | 26.24 (4.76) | 27.08 (3.85) |
| Waist circumference, cm | 87.29 (12.04) | 81.91 (11.32) | 93.24 (9.82) |
| Appendicular skeletal muscle mass index, kg/m$^2$ | 7.34 (1.23) | 6.55 (0.85) | 8.24 (0.94) |
| Hand grip strength, kg | 31.25 (10.51) | 24.02 (5.96) | 39.24 (8.46) |
| Fat-free muscle volume, L | 10.34 (2.57) | 8.36 (1.18) | 12.54 (1.77) |
| Fat-free muscle volume index, L/m$^2$ | 3.57 (0.62) | 3.14 (0.37) | 4.05 (0.48) |
| Muscle fat infiltration, % | 7.41 (1.86) | 7.93 (1.85) | 6.83 (1.69) |
| Visceral adipose tissue volume, L | 3.68 (2.21) | 2.63 (1.51) | 4.84 (2.28) |
| Abdominal subcutaneous adipose tissue volume, L | 7.01 (3.19) | 8.05 (3.41) | 5.85 (2.46) |
| N hand grip strength <16/27 kg (females/males) | 612 (6.37%) | 338 (6.70%) | 274 (6.00%) |
| N stairs climbed = None | 758 (7.88%) | 385 (7.63%) | 373 (8.16%) |
| N walking pace = Slow | 420 (4.37%) | 241 (4.78%) | 179 (3.92%) |
| N falls last year >1 | 457 (4.75%) | 291 (5.77%) | 166 (3.63%) |

TABLE 2

Fraction of subjects failing current tests for sarcopenia detection: muscle assessment (appendicular skeletal muscle mass index (ASMi) assessed by dual-energy X-ray absorptiometry (DXA)), hand grip strength test, and the combination of the two, for sex-specific BMI classes: underweight (BMI < 20 kg/m$^2$), normal weight (20 ≤ BMI < 25 kg/m$^2$), overweight (25 ≤ BMI < 30 kg/m$^2$), and obese (BMI >= 30 kg/m$^2$).

| | Females | | | | Males | | | |
|---|---|---|---|---|---|---|---|---|
| | N | Low hand grip strength | Low ASM/ height$^2$ | Low ASM/ height$^2$ and hand grip strength | N | Low hand grip strength | Low ASM/ height$^2$ | Low ASM/ height$^2$ and hand grip strength |
| All | 2,427 | 8.7% | 6.6% | 1.3% | 2,157 | 5.6% | 14.1% | 1.3% |
| Underweight | 107 | 7.5% | 39.3% | 6.5% | 23 | 8.7% | 91.3% | 8.7% |
| Normal weight | 1,002 | 7.4% | 11.1% | 2.2% | 620 | 6.8% | 36.8% | 3.2% |
| Overweight | 862 | 9.3% | 0.8% | 0.2% | 1,104 | 5.3% | 4.9% | 0.6% |
| Obese | 456 | 11.0% | 0.0% | 0.0% | 410 | 4.4% | 0.2% | 0.0% |

TABLE 3

Coefficients of determination (R$^2$) with sign of correlation between adjusted muscle quantity measures and body size measures. ASM, appendicular skeletal muscle mass; BMI, body mass index; DXA, dual-energy X-ray absorptiometry; FFMV, fat-free muscle volume; MRI, magnetic resonance imaging; VCG, virtual control group.

| | | Females | | | Males | | |
|---|---|---|---|---|---|---|---|
| | | Height | Weight | BMI | Height | Weight | BMI |
| DXA | ASM | 0.248 (+) | 0.633 (+) | 0.378 (+) | 0.294 (+) | 0.661 (+) | 0.379 (+) |
| | ASM/height$^2$ | 0.001 (−) | 0.566 (+) | 0.640 (+) | 0.001 (+) | 0.498 (+) | 0.591 (+) |
| | ASM/weight | 0.041 (+) | 0.315 (−) | 0.397 (−) | 0.013 (+) | 0.203 (−) | 0.275 (−) |
| | ASM/BMI | 0.480 (+) | 0.060 (−) | 0.315 (−) | 0.475 (+) | 0.003 (−) | 0.184 (−) |
| MRI | FFMV | 0.314 (+) | 0.370 (+) | 0.155 (+) | 0.311 (+) | 0.418 (+) | 0.179 (+) |
| | FFMV/height$^2$ | 0.001 (+) | 0.304 (+) | 0.317 (+) | 0.005 (+) | 0.287 (+) | 0.303 (+) |
| | FFMV/weight | 0.033 (+) | 0.387 (−) | 0.497 (−) | 0.021 (+) | 0.221 (−) | 0.328 (−) |
| | FFMV/BMI | 0.348 (+) | 0.140 (−) | 0.413 (−) | 0.358 (+) | 0.033 (−) | 0.256 (−) |
| | FFMVi$_{VCG}$ | 0.014 (+) | 0.010 (+) | 0.002 (+) | 0.016 (+) | 0.018 (+) | 0.006 (+) |

TABLE 4

5-year percentage difference with corresponding standard deviations and effect sizes for fat-free muscle volume (FFMV) index$_{VCG}$, muscle fat infiltration, and body size adjustments of muscle measurements commonly used to assess muscle mass/volume for sarcopenia detection. Standard deviation given as average standard deviation over sex and age. ASM, appendicular skeletal muscle mass; VCG, virtual control group; SD$_{VCG}$, number of standard deviations from mean virtual control group.

|  | Fat-free muscle volume index$_{VCG}$ | Muscle fat infiltration | ASM/ height$^2$ | ASM/ weight | ASM/ BMI | FFMV/ height$^2$ | FFMV/ weight | FFMV/ BMI |
|---|---|---|---|---|---|---|---|---|
| 5-year difference | −0.193 SD$_{VCG}$ | 0.399 pp | −0.098 kg/m$^2$ | −0.003 m$^{-2}$ | −0.017 m$^2$ | −0.073 L/m$^2$ | −0.002 L/kg | −0.011 Lm$^2$/kg |
| Standard deviation | 0.935 SD$_{VCG}$ | 1.652 pp | 0.872 kg/m$^2$ | 0.027 m$^{-2}$ | 0.101 m$^2$ | 0.405 L/m$^2$ | 0.017 L/kg | 0.060 Lm$^2$/kg |
| 5-year effect size | −0.206 | 0.241 | −0.112 | −0.116 | −0.172 | −0.180 | −0.135 | −0.176 |

TABLE 5

Results from the multivariable statistical modelling of health care burden (defined as number of hospitalization nights within 10 years prior to scanning, excluding pregnancy related nights (ICD10-codes under O and P), and truncated at 30 nights). Low appendicular skeletal muscle mass index (ASMi) is defined as below sarcopenia thresholds for females/males: 6.0/7.0 kg/m$^2$; Low hand grip strength is defined as below sarcopenia thresholds for females/males: 16/27 kg. Values are odds ratios and associated confidence intervals. Models adjusted for sex and age.

|  | Group | Muscle fat infiltration | Fat-free muscle volume index$_{VCG}$ | Visceral adipose tissue index | Abdominal subcutaneous adipose tissue index |
|---|---|---|---|---|---|
| Health care burden | All (N = 9,615) | 1.08 (1.04-1.13) *** | 0.91 (0.85-0.98) ** | 1.15 (1.01-1.31) * | 1.05 (0.97-1.14) ns |
|  | Low ASM/height$^2$ (N = 797) | 1.34 (1.12-1.59) *** | 0.66 (0.46-0.95) * | 0.41 (0.19-0.88) * | 0.81 (0.52-1.26) ns |
|  | Low hand grip strength (N = 612) | 1.29 (1.06-1.56) * | 0.82 (0.56-1.19) ns | 1.34 (0.68-2.64) ns | 0.89 (0.6-1.3) ns |

Level of significance: * p < 0.05,  p < 0.01, * p < 0.001, ns non-significant.
VCG, virtual control group.

TABLE 6

Results from the multivariable statistical modelling of functional outcomes (handgrip strength: comparing subjects above and below sarcopenia thresholds for females/males: 16/27 kg, usual walking pace: comparing slow pace to steady average pace and brisk pace, stair climbing: stairs climbed last 4 weeks comparing none to 1 or more than 1 times a day, and number of falls: number of falls last year comparing more than one fall to none). Values are odds ratios and associated confidence intervals. Models adjusted for age and BMI; model including all subjects additionally adjusted for sex.

| Functional outcome | Group | Fat-free muscle volume index$_{VCG}$ | Muscle fat infiltration |
|---|---|---|---|
| Hand grip strength (N = 612) | All | 0.64 (0.58-0.71) *** | 1.10 (1.04-1.16) *** |
|  | Females | 0.64 (0.56-0.73) *** | 1.07 (1.00-1.15) ns |
|  | Males | 0.64 (0.55-0.75) *** | 1.13 (1.04-1.23) ** |
| Stair climbing (N = 758) | All | 0.80 (0.73-0.88) *** | 1.07 (1.01-1.12) * |
|  | Females | 0.76 (0.67-0.86) *** | 1.10 (1.03-1.17) ** |
|  | Males | 0.84 (0.73-0.95) ** | 1.02 (0.95-1.11) ns |
| Walking pace (N = 420) | All | 0.55 (0.49-0.63) *** | 1.18 (1.11-1.25) *** |
|  | Females | 0.55 (0.47-0.66) *** | 1.15 (1.07-1.25) *** |
|  | Males | 0.55 (0.45-0.67) *** | 1.21 (1.11-1.33) *** |
| Number of falls (N = 457) | All | 1.00 (0.89-1.11) ns | 1.11 (1.04-1.18) ** |
|  | Females | 0.99 (0.87-1.14) ns | 1.13 (1.05-1.22) ** |
|  | Males | 0.99 (0.82-1.20) ns | 1.05 (0.94-1.17) ns |

Level of significance: * p < 0.05,  p < 0.01, * p < 0.001, ns non-significant.
VCG, virtual control group.

TABLE 7

Diagnostic performance of muscle measurements for predicting functional outcomes (handgrip strength: comparing subjects above and below sarcopenia thresholds for females/males: 16/27 kg, usual walking pace: comparing slow pace to steady average pace and brisk pace, stair climbing: stairs climbed last 4 weeks comparing none to 1 or more than 1 times a day, and number of falls: number of falls last year comparing more than one fall to none). Values are area under the receiver operator characteristic curves (AUCs) with associated confidence intervals. Predictors were the fitted values extracted from 4 logistic regressions predicting the functional outcomes using (1) fat-free muscle volume index, (2) fat-free muscle volume index$_{VCG}$, (3) muscle fat infiltration, and (4) fat-free muscle volume index$_{VCG}$ and muscle fat infiltration combined.

| Functional outcome | Group | Fat-free muscle volume index | Fat-free muscle volume index$_{VCG}$ | Muscle fat infiltration | Fat-free muscle volume index$_{VCG}$ + Muscle fat infiltration |
|---|---|---|---|---|---|
| Hand grip strength (N = 612) | All | 0.59 (0.57-0.62) | 0.65 (0.63-0.68) | 0.62 (0.60-0.65) | 0.67 (0.65-0.69) |
| | Females | 0.61 (0.58-0.64) | 0.65 (0.62-0.68) | 0.63 (0.60-0.66) | 0.67 (0.64-0.69) |
| | Males | 0.65 (0.61-0.68) | 0.66 (0.63-0.69) | 0.62 (0.59-0.66) | 0.67 (0.64-0.70) |
| Stair climbing (N = 758) | All | 0.53 (0.50-0.55) | 0.66 (0.64-0.69) | 0.75 (0.72-0.77) | 0.76 (0.74-0.78) |
| | Females | 0.52 (0.48-0.56) | 0.65 (0.61-0.69) | 0.76 (0.73-0.78) | 0.76 (0.73-0.79) |
| | Males | 0.56 (0.51-0.61) | 0.68 (0.64-0.72) | 0.74 (0.70-0.78) | 0.76 (0.72-0.80) |
| Walking pace (N = 420) | All | 0.52 (0.50-0.54) | 0.59 (0.57-0.61) | 0.59 (0.57-0.61) | 0.60 (0.58-0.62) |
| | Females | 0.56 (0.53-0.59) | 0.61 (0.58-0.64) | 0.63 (0.60-0.65) | 0.64 (0.61-0.67) |
| | Males | 0.53 (0.50-0.56) | 0.57 (0.54-0.60) | 0.57 (0.54-0.60) | 0.58 (0.55-0.61) |
| Number of falls (N = 457) | All | 0.54 (0.52-0.57) | 0.53 (0.50-0.56) | 0.62 (0.59-0.65) | 0.62 (0.59-0.65) |
| | Females | 0.53 (0.49-0.56) | 0.53 (0.49-0.57) | 0.62 (0.59-0.66) | 0.62 (0.59-0.66) |
| | Males | 0.51 (0.47-0.56) | 0.53 (0.48-0.58) | 0.57 (0.53-0.62) | 0.57 (0.53-0.62) |

VCG, virtual control group.

TABLE 8

Percentage of females with low functional performance below different threshold values of fat-free muscle volume index$_{VCG}$ (FFMV$_{VCG}$) per BMI class.

| Fat-free muscle volume index$_{VCG}$ (FFMVi$_{VCG}$) threshold (# SDs from mean VCG) | | 0.00 | | −0.25 | | −0.50 | | −0.75 | | −1.00 | | −1.25 | |
|---|---|---|---|---|---|---|---|---|---|---|---|---|---|
| Group | Functional outcome | % below FFMVi$_{VCG}$ threshold | % low functional performance | % below FFMVi$_{VCG}$ threshold | % low functional performance | % below FFMVi$_{VCG}$ threshold | % low functional performance | % below FFMVi$_{VCG}$ threshold | % low functional performance | % below FFMVi$_{VCG}$ threshold | % low functional performance | % below FFMVi$_{VCG}$ threshold | % low functional performance |
| All N = 5,046 | Hand grip strength | 52.1 | 16.8 | 41.6 | 9.6 | 31.8 | 10.9 | 22.8 | 11.6 | 15.1 | 13.9 | 9.1 | 14.4 |
|  | Walking pace |  | 15.6 |  | 7.0 |  | 8.2 |  | 8.8 |  | 10.5 |  | 13.5 |
|  | Stair Climbing |  | 16.4 |  | 10.3 |  | 11.8 |  | 12.3 |  | 14.0 |  | 14.6 |
|  | Number of falls |  | 9.2 |  | 6.6 |  | 6.7 |  | 7.2 |  | 7.2 |  | 7.8 |
| Under- weight N = 232 | Hand grip strength | 60.8 | NA | 53.9 | 11.2 | 44.8 | 12.5 | 31.5 | 16.4 | 19 | 18.2 |  | NA |
|  | Walking pace |  | NA |  | 4.0 |  | 4.8 |  | 5.5 |  | 6.8 |  | NA |
|  | Stair Climbing |  | NA |  | 4.8 |  | 4.8 |  | 6.8 |  | 6.8 |  | NA |
|  | Number of falls |  | NA |  | 4.8 |  | 5.8 |  | 8.2 |  | 9.1 |  | NA |
| Normal weight N = 2,103 | Hand grip strength | 53.7 | 8.5 | 42.7 | 8.9 | 32.1 | 10.5 | 22.6 | 10.9 | 5 | 12.7 | 8.8 | 14.0 |
|  | Walking pace |  | 2.7 |  | 2.8 |  | 3.6 |  | 4.4 |  | 5.1 |  | 5.9 |
|  | Stair Climbing |  | 8.4 |  | 9.2 |  | 10.4 |  | 9.3 |  | 9.2 |  | 10.2 |
|  | Number of falls |  | 4.3 |  | 4.8 |  | 4.6 |  | 5.3 |  | 4.7 |  | 5.4 |
| Over- weight N = 1,776 | Hand grip strength | 50.7 | 8.8 | 40.8 | 9.0 | 31.0 | 10.2 | 22.5 | 11.2 | 14.9 | 13.6 | 9.5 | 12.5 |
|  | Walking pace |  | 5.9 |  | 6.8 |  | 8.3 |  | 8.8 |  | 10.9 |  | 13.7 |
|  | Stair Climbing |  | 9.6 |  | 10.8 |  | 12.7 |  | 13.8 |  | 18.5 |  | 20.2 |
|  | Number of falls |  | 7.4 |  | 8.1 |  | 8.9 |  | 8.2 |  | 8.3 |  | 8.3 |
| Obese N = 934 | Hand grip strength | 49.3 | 11.3 | 37.7 | 11.9 | 29.1 | 12.5 | 21.6 | 11.9 | 14.9 | 15.8 | 8.6 | 18.8 |
|  | Walking pace |  | 17.4 |  | 19.3 |  | 21.0 |  | 20.3 |  | 23.0 |  | 31.2 |
|  | Stair Climbing |  | 12.4 |  | 14.2 |  | 16.2 |  | 18.3 |  | 18.7 |  | 15.0 |
|  | Number of falls |  | 8.9 |  | 8.8 |  | 8.1 |  | 9.4 |  | 10.1 |  | 10.0 |

| Fat-free muscle volume index$_{VCG}$ (FFMVi$_{VCG}$) threshold (# SDs from mean VCG) | | −1.50 | | −1.75 | | −2.00 | | −2.25 | | −2.50 | |
|---|---|---|---|---|---|---|---|---|---|---|---|
| Group | Functional outcome | % below FFMVi$_{VCG}$ threshold | % low functional performance | % below FFMVi$_{VCG}$ threshold | % low functional performance | % below FFMVi$_{VCG}$ threshold | % low functional performance | % below FFMVi$_{VCG}$ threshold | % low functional performance | % below FFMVi$_{VCG}$ threshold | % low functional performance |
| All N = 5,046 | Hand grip strength | 5.2 | NA | 2.8 | 23.6 | 1.4 | 23.2 | 0.5 | NA | 0.3 | NA |
|  | Walking pace |  | NA |  | 20.0 |  | 18.8 |  | NA |  | NA |
|  | Stair Climbing |  | NA |  | 17.9 |  | 20.3 |  | NA |  | NA |
|  | Number of falls |  | NA |  | 11.4 |  | 11.6 |  | NA |  | NA |
| Under- weight N = 232 | Hand grip strength | 6.9 | NA | 3.0 | NA | 2.6 | NA | 1.3 | NA | 0.4 | NA |
|  | Walking pace |  | NA |  | NA |  | NA |  | NA |  | NA |
|  | Stair Climbing |  | NA |  | NA |  | NA |  | NA |  | NA |
|  | Number of falls |  | NA |  | NA |  | NA |  | NA |  | NA |
| Normal weight N = 2,103 | Hand grip strength | 4.9 | NA | 2.8 | 27.1 | 1.0 | NA | 0.4 | NA | 0.2 | NA |
|  | Walking pace |  | NA |  | 10.2 |  | NA |  | NA |  | NA |
|  | Stair Climbing |  | 6.7 |  | 13.6 |  | NA |  | NA |  | NA |
|  | Number of falls |  | 13.5 |  | 5.1 |  | NA |  | NA |  | NA |
|  |  |  | 4.8 |  |  |  |  |  |  |  |  |

TABLE 8-continued

Percentage of females with low functional performance below different threshold values of fat-free muscle volume index$_{VCG}$ (FFMV$_{VCG}$) per BMI class.

| | | | | | | | |
|---|---|---|---|---|---|---|---|
| Over- weight N = 1,776 | Hand grip strength | 5.6 | 13.0 | 2.9 | 15.7 | 1.4 | 0.3 | NA |
| | Walking pace | | 18.0 | | 25.5 | | | NA |
| | Stair Climbing | | 19.0 | | 21.6 | | | NA |
| | Number of falls | | 11.0 | | 15.7 | | | NA |
| Obese N = 934 | Hand grip strength | 4.5 | 19.0 | 2.5 | NA | 1.7 | 0.9 | 0.4 NA |
| | Walking pace | | 31.0 | | NA | | | NA |
| | Stair Climbing | | 21.4 | | NA | | | NA |
| | Number of falls | | 11.9 | | NA | | | NA |

Functional performance described by handgrip strength: comparing subjects above and below sarcopenia thresholds for females/males: 16/27 kg, usual walking pace: comparing slow pace to steady average pace and brisk pace, stair climbing: stairs climbed last 4 weeks comparing none to 1 or more than 1 times a day, and number of falls: number of falls last year comparing more than one fall to none. Values not shown for group sizes smaller than 25 subjects (indicated by NA: not applicable). VCG, virtual control group; SD, standard deviation.

TABLE 9

Percentage of females with low functional performance above different threshold values of muscle fat infiltration (MFI) per BMI class.

| | | 7.93% | | 8.39% | | 8.85% | | 9.317% | | 9.78% | | 10.24% | |
|---|---|---|---|---|---|---|---|---|---|---|---|---|---|
| Group | Muscle fat infiltration (MFI) thresholds / Functional outcome | % above MFI threshold | % low functional performance | % above MFI threshold | % low functional performance | % above MFI threshold | % low functional performance | % above MFI threshold | % low functional performance | % above MFI threshold | % low functional performance | % above MFI threshold | % low functional performance |
| All N = 5,046 | Hand grip strength | 43.1 | 9.0 | 33.9 | 9.5 | 25.3 | 10.2 | 19.1 | 11.0 | 14.1 | 11.8 | 10.4 | 11.8 |
| | Walking pace | | 8.6 | | 9.8 | | 11.0 | | 12.3 | | 13.5 | | 14.3 |
| | Stair Climbing | | 10.3 | | 10.9 | | 11.7 | | 12.7 | | 13.6 | | 15.0 |
| | Number of falls | | 8.0 | | 9.0 | | 9.5 | | 10.0 | | 10.8 | | 11.0 |
| Under-weight N = 232 | Hand grip strength | 12.5 | 10.3 | 8.2 | NA | 3.4 | NA | 1.3 | NA | 0.9 | NA | 0.4 | NA |
| | Walking pace | | 13.8 | | NA | | NA | | NA | | NA | | NA |
| | Stair Climbing | | 13.8 | | NA | | NA | | NA | | NA | | NA |
| | Number of falls | | 17.2 | | NA | | NA | | NA | | NA | | NA |
| Normal weight N = 2,103 | Hand grip strength | 26.3 | 10.5 | 18.6 | 11.0 | 12.1 | 14.2 | 8.0 | 17.3 | 5.8 | 19.7 | 3.7 | 19.2 |
| | Walking pace | | 3.4 | | 3.8 | | 3.9 | | 1.8 | | 0.8 | | 1.3 |
| | Stair Climbing | | 10.1 | | 9.7 | | 10.6 | | 11.9 | | 12.3 | | 14.1 |
| | Number of falls | | 4.3 | | 4.8 | | 3.9 | | 3.6 | | 4.9 | | 5.1 |
| Over-weight N = 1,776 | Hand grip strength | 49.9 | 7.8 | 39.0 | 8.4 | 28.8 | 9.2 | 21.7 | 10.1 | 15.7 | 10.8 | 11.0 | 9.7 |
| | Walking pace | | 5.4 | | 5.9 | | 6.6 | | 6.8 | | 6.8 | | 7.7 |
| | Stair Climbing | | 10.0 | | 10.7 | | 11.9 | | 12.5 | | 13.7 | | 15.3 |
| | Number of falls | | 8.1 | | 8.8 | | 9.8 | | 10.4 | | 10.8 | | 10.7 |
| Obese N = 934 | Hand grip strength | 75.5 | 9.4 | 64.8 | 9.8 | 54.0 | 9.3 | 43.9 | 9.3 | 33.3 | 9.6 | 26.9 | 11.2 |
| | Walking pace | | 16.5 | | 17.7 | | 18.8 | | 21.7 | | 24.1 | | 23.1 |
| | Stair Climbing | | 10.6 | | 11.7 | | 11.9 | | 13.2 | | 14.1 | | 15.1 |
| | Number of falls | | 10.5 | | 11.4 | | 11.5 | | 11.7 | | 12.5 | | 12.7 |

| | | 10.70% | | 11.17% | | 11.64% | | 12.10% | | 12.56% | |
|---|---|---|---|---|---|---|---|---|---|---|---|
| Group | Muscle fat infiltration (MFI) thresholds / Functional outcome | % above MFI threshold | % low functional performance | % above MFI threshold | % low functional performance | % above MFI threshold | % low functional performance | % above MFI threshold | % low functional performance | % above MFI threshold | % low functional performance |
| All N = 5,046 | Hand grip strength | 7.3 | 12.5 | 5.3 | 14.0 | 4.0 | | 2.8 | 14.3 | 2.0 | 16.5 |
| | Walking pace | | 16.3 | | 18.5 | | | | 23.6 | | 25.2 |
| | Stair Climbing | | 15.2 | | 16.2 | | | | 17.1 | | 15.5 |
| | Number of falls | | 11.1 | | 10.9 | | | | 12.1 | | 13.6 |
| Under-weight N = 232 | Hand grip strength | 0.4 | NA | 0.4 | NA | 0.4 | NA | 0.4 | NA | 0.4 | NA |
| | Walking pace | | NA | | NA | | NA | | NA | | NA |
| | Stair Climbing | | NA | | NA | | NA | | NA | | NA |
| | Number of falls | | NA | | NA | | NA | | NA | | NA |
| Normal weight N = 2,103 | Hand grip strength | 1.9 | 24.4 | 1.3 | 28.6 | 1.0 | | 0.6 | | 0.3 | |
| | Walking pace | | 2.4 | | 3.6 | | | | | | |
| | Stair Climbing | | 12.2 | | 14.3 | | | | | | |
| | Number of falls | | 4.9 | | 7.1 | | | | | | |

TABLE 9-continued

Percentage of females with low functional performance above different threshold values of muscle fat infiltration (MFI) per BMI class.

| | | | | | | | | | |
|---|---|---|---|---|---|---|---|---|---|
| Over-weight N = 1,776 | Hand grip strength | 7.2 | 10.2 | 4.6 | 12.2 | 3.5 | 11.1 | 2.5 | 13.6 | 1.7 | 16.1 |
| | Walking pace | | 9.4 | | 8.5 | | 9.5 | | 6.8 | | 6.5 |
| | Stair Climbing | | 14.8 | | 14.6 | | 15.9 | | 15.9 | | 12.9 |
| | Number of falls | | 10.2 | | 8.5 | | 9.5 | | 9.1 | | 9.7 |
| Obese N = 934 | Hand grip strength | 21.3 | 11.6 | 16.5 | 12.3 | 12.2 | 12.3 | 8.8 | 12.2 | 6.9 | 14.1 |
| | Walking pace | | 23.1 | | 26.0 | | 29.8 | | 34.1 | | 34.4 |
| | Stair Climbing | | 16.1 | | 17.5 | | 18.4 | | 19.5 | | 17.2 |
| | Number of falls | | 12.6 | | 12.3 | | 13.2 | | 13.4 | | 14.1 |

Functional performance described by handgrip strength: comparing subjects above and below sarcopenia thresholds for females/males: 16/27 kg, usual walking pace: comparing slow pace to steady average pace and brisk pace, stair climbing: stairs climbed last 4 weeks comparing none to 1 or more than 1 times a day, and number of falls: number of falls last year comparing more than one fall to none. Values not shown for group sizes smaller than 25 subjects (indicated by NA: not applicable).

TABLE 10

Percentage of males with low functional performance below different threshold values of fat-free muscle volume index$_{rCG}$ (FFMVi$_{rCG}$) per BMI class.

| Fat-free muscle volume index$_{rCG}$ (FFMVi$_{rCG}$) thresholds (# SDs from mean VCG) | | 0.00 | | -0.25 | | -0.50 | | -0.75 | | -1.00 | | -1.25 | |
|---|---|---|---|---|---|---|---|---|---|---|---|---|---|
| Group | Functional outcome | % below FFMVi$_{rCG}$ threshold | % low functional performance | % below FFMVi$_{rCG}$ threshold | % low functional performance | % below FFMVi$_{rCG}$ threshold | % low functional performance | % below FFMVi$_{rCG}$ threshold | % low functional performance | % below FFMVi$_{rCG}$ threshold | % low functional performance | % below FFMVi$_{rCG}$ threshold | % low functional performance |
| All N = 4,569 | Hand grip strength | 51.9 | 8.2 | 41.8 | 9.1 | 31.4 | 9.9 | 22.5 | 11.1 | 15.0 | 12.2 | 9.0 | 13.8 |
| | Walking pace | | 5.7 | | 6.4 | | 7.5 | | 8.3 | | 9.5 | | 11.4 |
| | Stair Climbing | | 9.4 | | 10.1 | | 10.2 | | 10.1 | | 9.5 | | 9.4 |
| | Number of falls | | 4.0 | | 3.9 | | 4.0 | | 4.5 | | 5.3 | | 5.6 |
| Under-weight N = 57 | Hand grip strength | 66.7 | 7.9 | 57.9 | 3.0 | 45.6 | 3.8 | 35.1 | NA | 28.1 | NA | 17.5 | NA |
| | Walking pace | | 0.0 | | 0.0 | | 0.0 | | NA | | NA | | NA |
| | Stair Climbing | | 0.0 | | 0.0 | | 0.0 | | NA | | NA | | NA |
| | Number of falls | | 5.3 | | 6.1 | | 3.8 | | NA | | NA | | NA |
| Normal weight N = 1,365 | Hand grip strength | 56.8 | 9.2 | 47.1 | 10.0 | 36.0 | 10.6 | 25.1 | 11.7 | 16.0 | 13.7 | 9.5 | 14.7 |
| | Walking pace | | 2.8 | | 3.3 | | 3.9 | | 4.4 | | 6.4 | | 7.0 |
| | Stair Climbing | | 8.3 | | 8.9 | | 9.4 | | 9.3 | | 8.2 | | 10.1 |
| | Number of falls | | 2.1 | | 2.0 | | 2.2 | | 2.6 | | 3.2 | | 3.1 |
| Over-weight N = 2,269 | Hand grip strength | 49.4 | 8.4 | 39.3 | 9.4 | 29.7 | 10.1 | 21.2 | 11.6 | 14.5 | 12.8 | 8.6 | 15.3 |
| | Walking pace | | 5.0 | | 5.4 | | 5.9 | | 6.8 | | 7.0 | | 6.6 |
| | Stair Climbing | | 9.5 | | 10.4 | | 10.1 | | 9.8 | | 10.4 | | 9.2 |
| | Number of falls | | 4.1 | | 4.1 | | 4.2 | | 4.8 | | 5.2 | | 5.6 |
| Obese N = 876 | Hand grip strength | 49.9 | 5.9 | 38.8 | 7.1 | 28.1 | 8.5 | 20.7 | 9.4 | 13.7 | 9.2 | 8.9 | 10.3 |
| | Walking pace | | 13.0 | | 15.6 | | 19.5 | | 20.4 | | 23.3 | | 32.1 |
| | Stair Climbing | | 11.7 | | 12.6 | | 13.0 | | 13.8 | | 10.8 | | 10.3 |
| | Number of falls | | 6.9 | | 6.8 | | 7.3 | | 7.2 | | 9.2 | | 10.3 |

| | | -1.50 | | -1.75 | | -2.00 | | -2.25 | | -2.50 | |
|---|---|---|---|---|---|---|---|---|---|---|---|
| Group | Functional outcome | % below FFMVi$_{rCG}$ threshold | % low functional performance | % below FFMVi$_{rCG}$ threshold | % low functional performance | % below FFMVi$_{rCG}$ threshold | % low functional performance | % below FFMVi$_{rCG}$ threshold | % low functional performance | % below FFMVi$_{rCG}$ threshold | % low functional performance |
| All N = 4,569 | Hand grip strength | 5.1 | 15.3 | 2.8 | 14.2 | 1.3 | 16.4 | 0.7 | 23.3 | 0.3 | NA |
| | Walking pace | | 14.9 | | 18.1 | | 21.3 | | 20.0 | | NA |
| | Stair Climbing | | 9.8 | | 9.4 | | 11.5 | | 13.3 | | NA |
| | Number of falls | | 6.4 | | 6.3 | | 8.2 | | 13.3 | | NA |
| Under-weight N = 57 | Hand grip strength | 8.8 | NA | 5.3 | NA | 1.8 | NA | 1.8 | NA | 1.8 | NA |
| | Walking pace | | NA | | NA | | NA | | NA | | NA |
| | Stair Climbing | | NA | | NA | | NA | | NA | | NA |
| | Number of falls | | NA | | NA | | NA | | NA | | NA |
| Normal weight N = 1,365 | Hand grip strength | 5.3 | 15.1 | 2.8 | 13.2 | 1.4 | NA | 0.7 | NA | 0.4 | NA |
| | Walking pace | | 9.6 | | 13.2 | | NA | | NA | | NA |
| | Stair Climbing | | 11.0 | | 7.9 | | NA | | NA | | NA |
| | Number of falls | | 2.7 | | 5.3 | | NA | | NA | | NA |

TABLE 10-continued

Percentage of males with low functional performance below different threshold values of fat-free muscle volume index$_{VCG}$ (FFMV$_{VCG}$) per BMI class.

| | | | | | | | | | |
|---|---|---|---|---|---|---|---|---|---|
| Over-weight N = 2,269 | Hand grip strength | 4.8 | 20.4 | 2.6 | 22.0 | 1.2 | 22.2 | 0.6 | NA | NA | 0.1 | NA |
| | Walking pace | | 8.3 | | 11.9 | | 18.5 | | NA | NA | | NA |
| | Stair Climbing | | 10.2 | | 11.9 | | 14.8 | | NA | NA | | NA |
| | Number of falls | | 6.5 | | 6.8 | | 11.1 | | NA | NA | | NA |
| Obese N = 876 | Hand grip strength | 5.6 | 6.1 | 3.1 | 0.0 | 1.6 | NA | 0.8 | NA | NA | 0.3 | NA |
| | Walking pace | | 38.8 | | 40.7 | | NA | | NA | NA | | NA |
| | Stair Climbing | | 8.2 | | 7.4 | | NA | | NA | NA | | NA |
| | Number of falls | | 12.2 | | 7.4 | | NA | | NA | NA | | NA |

Functional performance described by handgrip strength: comparing subjects above and below sarcopenia thresholds for females/males: 16/27 kg, usual walking pace: comparing slow pace to steady average pace and brisk pace, stair climbing: stairs climbed last 4 weeks comparing none to 1 or more than 1 times a day, and number of falls: number of falls last year comparing more than one fall to none. Values not shown for group sizes smaller than 25 subjects (indicated by NA: not applicable). VCG, virtual control group; SD, standard deviation.

TABLE 11

Percentage of males with low functional performance above different threshold values of muscle fat infiltration (MFI) per BMI class. Functional performance described by handgrip strength: comparing subjects above and below sarcopenia thresholds for females/males: 16/27 kg, usual walking pace: comparing slow pace to steady average pace and brisk pace, stair climbing: stairs climbed last 4 weeks comparing none to 1 or more than 1 times a day, and number of falls: number of falls last year comparing more than one fall to none. Values not shown for group sizes smaller than 25 subjects (indicated by NA: not applicable).

| | | Muscle fat infiltration (MFI) thresholds | | | | | | | | | | | |
|---|---|---|---|---|---|---|---|---|---|---|---|---|---|
| | | 6.83% | | 7.25% | | 7.67% | | 8.10% | | 8.52% | | 8.94% | |
| Group | Functional outcome | % above MFI threshold | % low functional | % above MFI threshold | % low functional performance | % above MFI threshold | % low functional performance | % above MFI threshold | % low functional performance | % above MFI threshold | % low functional performance | % above MFI threshold | % low functional performance |
| All N = 4,569 | Hand grip strength | 43.6 | 8.1 | 33.5 | 9.1 | 25.2 | 9.7 | 18.9 | 9.2 | 13.8 | 9.5 | 9.8 | 10.1 |
| | Walking pace | | 6.8 | | 8.0 | | 9.3 | | 10.8 | | 12.5 | | 14.8 |
| | Stair Climbing | | 10.0 | | 10.8 | | 11.3 | | 11.4 | | 12.0 | | 11.0 |
| | Number of falls | | 4.6 | | 4.4 | | 4.8 | | 5.0 | | 4.9 | | 5.8 |
| Underweight N = 57 | Hand grip strength | 10.5 | NA | 7.0 | NA | 7.0 | NA | 7.0 | NA | 1.8 | NA | 0.0 | NA |
| | Walking pace | | NA | | NA | | NA | | NA | | NA | | NA |
| | Stair Climbing | | NA | | NA | | NA | | NA | | NA | | NA |
| | Number of falls | | NA | | NA | | NA | | NA | | NA | | NA |
| Normal weight N = 1,365 | Hand grip strength | 24.2 | 9.7 | 15.4 | 11.9 | 9.9 | 12.6 | 5.9 | 14.8 | 4.1 | 17.9 | 2.0 | 18.5 |
| | Walking pace | | 3.9 | | 4.8 | | 5.9 | | 6.2 | | 7.1 | | 11.1 |
| | Stair Climbing | | 9.7 | | 9.0 | | 9.6 | | 6.2 | | 8.9 | | 7.4 |
| | Number of falls | | 3.9 | | 1.9 | | 2.2 | | 1.2 | | 1.8 | | 0.0 |
| Overweight N = 2,269 | Hand grip strength | 45.4 | 9.2 | 34.9 | 10.4 | 25.6 | 11.9 | 18.5 | 10.5 | 13.0 | 11.2 | 9.0 | 11.8 |
| | Walking pace | | 4.8 | | 5.3 | | 5.5 | | 6.7 | | 7.1 | | 9.3 |
| | Stair Climbing | | 9.8 | | 11.1 | | 11.9 | | 12.6 | | 13.2 | | 12.3 |
| | Number of falls | | 4.3 | | 4.7 | | 5.2 | | 5.7 | | 5.4 | | 6.4 |
| Obese N = 876 | Hand grip strength | 71.5 | 5.3 | 59.9 | 6.1 | 49.3 | 6.0 | 41.1 | 6.7 | 31.8 | 6.1 | 24.7 | 7.4 |
| | Walking pace | | 11.5 | | 13.5 | | 15.5 | | 16.7 | | 19.4 | | 20.4 |
| | Stair Climbing | | 10.7 | | 11.0 | | 11.1 | | 11.4 | | 11.5 | | 10.2 |
| | Number of falls | | 5.6 | | 5.1 | | 5.1 | | 5.0 | | 5.0 | | 6.0 |

| | | Muscle fat infiltration (MFI) thresholds | | | | | | | | | |
|---|---|---|---|---|---|---|---|---|---|---|---|
| | | 9.36% | | 9.79% | | 10.21% | | 10.63% | | 11.06% | |
| Group | Functional outcome | % above MFI threshold | % low functional performance | % above MFI threshold | % low functional performance | % above MFI threshold | % low functional performance | % above MFI threshold | % low functional performance | % above MFI threshold | % low functional performance |
| All N = 4,569 | Hand grip strength | 6.9 | 12.0 | 5.1 | 14.0 | 3.6 | 15.2 | 2.6 | 14.0 | 2.0 | 12.9 |
| | Walking pace | | 18.3 | | 20.9 | | 24.8 | | 26.4 | | 25.8 |
| | Stair Climbing | | 12.0 | | 13.6 | | 12.7 | | 13.2 | | 15.1 |
| | Number of falls | | 7.3 | | 8.1 | | 6.1 | | 6.6 | | 6.5 |
| Underweight N = 57 | Hand grip strength | 0.0 | NA | 0.0 | NA | 0.0 | NA | 0.0 | NA | 0.0 | NA |
| | Walking pace | | NA | | NA | | NA | | NA | | NA |
| | Stair Climbing | | NA | | NA | | NA | | NA | | NA |
| | Number of falls | | NA | | NA | | NA | | NA | | NA |
| Normal weight N = 1,365 | Hand grip strength | 1.4 | NA | 0.7 | NA | 0.4 | NA | 0.4 | NA | 0.3 | NA |
| | Walking pace | | NA | | NA | | NA | | NA | | NA |
| | Stair Climbing | | NA | | NA | | NA | | NA | | NA |
| | Number of falls | | NA | | NA | | NA | | NA | | NA |
| Overweight N = 2,269 | Hand grip strength | 5.9 | 13.3 | 4.0 | 17.6 | 2.5 | 19.3 | 1.7 | 17.9 | 1.4 | 15.6 |
| | Walking pace | | 12.6 | | 13.2 | | 15.8 | | 15.4 | | 15.6 |
| | Stair Climbing | | 11.9 | | 14.3 | | 12.3 | | 12.8 | | 15.6 |
| | Number of falls | | 8.1 | | 9.9 | | 8.8 | | 7.7 | | 6.2 |
| Obese N = 876 | Hand grip strength | 18.6 | 9.2 | 15.3 | 10.4 | 11.6 | 11.8 | 8.8 | 11.7 | 6.5 | 10.5 |
| | Walking pace | | 23.3 | | 26.1 | | 29.4 | | 31.2 | | 31.6 |
| | Stair Climbing | | 12.3 | | 14.2 | | 13.7 | | 14.3 | | 15.8 |
| | Number of falls | | 7.4 | | 7.5 | | 4.9 | | 6.5 | | 7.0 |

TABLE 12

Fat-free muscle volume index (FFMVi) values corresponding to
$FFMVi_{VCG}$ thresholds presented in Tables 7 (females) and 9 (males).
VCG, virtual control group; SD, standard deviation.

Fat-free muscle volume index (FFMVi) corresponding to $FFMVi_{VCG}$ thresholds

| BMI (kg/m²) | Sex | 0.00 | −0.25 | −0.50 | −0.75 | −1.00 | −1.25 | −1.50 | −1.75 | −2.00 | −2.25 | −2.50 |
|---|---|---|---|---|---|---|---|---|---|---|---|---|
| | | Unit: #SDs from mean VCG ↑ L/m² ↓ | | | | | | | | | | |
| <20 | Females | 2.80 | 2.72 | 2.65 | 2.58 | 2.51 | 2.43 | 2.36 | 2.29 | 2.22 | 2.14 | 2.07 |
| | Males | 3.41 | 3.32 | 3.23 | 3.15 | 3.06 | 2.98 | 2.89 | 2.80 | 2.72 | 2.63 | 2.55 |
| 20 | Females | 2.86 | 2.78 | 2.71 | 2.63 | 2.56 | 2.49 | 2.41 | 2.34 | 2.27 | 2.19 | 2.12 |
| | Males | 3.52 | 3.43 | 3.34 | 3.24 | 3.15 | 3.06 | 2.97 | 2.87 | 2.78 | 2.69 | 2.60 |
| 21 | Females | 2.93 | 2.85 | 2.77 | 2.70 | 2.62 | 2.54 | 2.46 | 2.39 | 2.31 | 2.23 | 2.15 |
| | Males | 3.61 | 3.52 | 3.42 | 3.33 | 3.24 | 3.14 | 3.05 | 2.96 | 2.86 | 2.77 | 2.68 |
| 23 | Females | 2.98 | 2.90 | 2.83 | 2.75 | 2.67 | 2.60 | 2.52 | 2.45 | 2.37 | 2.29 | 2.22 |
| | Males | 3.71 | 3.62 | 3.53 | 3.43 | 3.34 | 3.25 | 3.16 | 3.06 | 2.97 | 2.88 | 2.79 |
| 24 | Females | 3.03 | 2.95 | 2.88 | 2.80 | 2.72 | 2.65 | 2.57 | 2.50 | 2.42 | 2.35 | 2.27 |
| | Males | 3.78 | 3.69 | 3.60 | 3.50 | 3.41 | 3.32 | 3.23 | 3.13 | 3.04 | 2.95 | 2.86 |
| 25 | Females | 3.07 | 2.99 | 2.92 | 2.84 | 2.77 | 2.69 | 2.62 | 2.54 | 2.47 | 2.39 | 2.32 |
| | Males | 3.86 | 3.76 | 3.67 | 3.57 | 3.48 | 3.38 | 3.29 | 3.19 | 3.10 | 3.00 | 2.91 |
| 26 | Females | 3.10 | 3.02 | 2.95 | 2.87 | 2.80 | 2.72 | 2.65 | 2.57 | 2.50 | 2.42 | 2.35 |
| | Males | 3.93 | 3.83 | 3.74 | 3.64 | 3.54 | 3.45 | 3.35 | 3.26 | 3.16 | 3.06 | 2.97 |
| 27 | Females | 3.14 | 3.06 | 2.99 | 2.91 | 2.83 | 2.76 | 2.68 | 2.61 | 2.53 | 2.46 | 2.38 |
| | Males | 3.99 | 3.90 | 3.80 | 3.70 | 3.61 | 3.51 | 3.41 | 3.32 | 3.22 | 3.12 | 3.03 |
| 28 | Females | 3.17 | 3.10 | 3.02 | 2.95 | 2.87 | 2.80 | 2.72 | 2.65 | 2.57 | 2.50 | 2.42 |
| | Males | 4.06 | 3.97 | 3.87 | 3.78 | 3.68 | 3.58 | 3.49 | 3.39 | 3.29 | 3.20 | 3.10 |
| 29 | Females | 3.21 | 3.14 | 3.06 | 2.98 | 2.91 | 2.83 | 2.76 | 2.68 | 2.60 | 2.53 | 2.45 |
| | Males | 4.13 | 4.03 | 3.93 | 3.84 | 3.74 | 3.64 | 3.54 | 3.44 | 3.35 | 3.25 | 3.15 |
| 30 | Females | 3.25 | 3.17 | 3.10 | 3.02 | 2.95 | 2.88 | 2.80 | 2.73 | 2.65 | 2.58 | 2.50 |
| | Males | 4.18 | 4.08 | 3.98 | 3.88 | 3.78 | 3.68 | 3.58 | 3.48 | 3.38 | 3.28 | 3.18 |
| 31 | Females | 3.30 | 3.22 | 3.15 | 3.07 | 2.99 | 2.92 | 2.84 | 2.77 | 2.69 | 2.61 | 2.54 |
| | Males | 4.25 | 4.14 | 4.03 | 3.93 | 3.82 | 3.71 | 3.61 | 3.50 | 3.39 | 3.29 | 3.18 |
| 32 | Females | 3.35 | 3.27 | 3.20 | 3.12 | 3.04 | 2.96 | 2.89 | 2.81 | 2.73 | 2.65 | 2.58 |
| | Males | 4.31 | 4.20 | 4.09 | 3.98 | 3.87 | 3.76 | 3.65 | 3.54 | 3.43 | 3.32 | 3.21 |
| 33 | Females | 3.40 | 3.32 | 3.24 | 3.16 | 3.08 | 3.01 | 2.93 | 2.85 | 2.77 | 2.70 | 2.62 |
| | Males | 4.36 | 4.25 | 4.14 | 4.02 | 3.91 | 3.79 | 3.68 | 3.56 | 3.45 | 3.33 | 3.22 |
| 34 | Females | 3.44 | 3.36 | 3.28 | 3.21 | 3.13 | 3.05 | 2.97 | 2.90 | 2.82 | 2.74 | 2.66 |
| | Males | 4.43 | 4.31 | 4.20 | 4.08 | 3.96 | 3.85 | 3.73 | 3.61 | 3.50 | 3.38 | 3.27 |
| 35 | Females | 3.47 | 3.39 | 3.32 | 3.24 | 3.17 | 3.09 | 3.01 | 2.94 | 2.86 | 2.79 | 2.71 |
| | Males | 4.45 | 4.34 | 4.22 | 4.11 | 4.00 | 3.89 | 3.77 | 3.66 | 3.55 | 3.44 | 3.33 |
| 36 | Females | 3.51 | 3.43 | 3.35 | 3.27 | 3.19 | 3.12 | 3.04 | 2.96 | 2.88 | 2.80 | 2.72 |
| | Males | 4.49 | 4.37 | 4.26 | 4.14 | 4.02 | 3.90 | 3.79 | 3.67 | 3.55 | 3.43 | 3.32 |
| 37 | Females | 3.55 | 3.47 | 3.38 | 3.30 | 3.21 | 3.13 | 3.05 | 2.96 | 2.88 | 2.80 | 2.71 |
| | Males | 4.52 | 4.40 | 4.28 | 4.15 | 4.03 | 3.91 | 3.79 | 3.66 | 3.54 | 3.42 | 3.30 |
| 38 | Females | 3.61 | 3.53 | 3.45 | 3.36 | 3.28 | 3.20 | 3.12 | 3.03 | 2.95 | 2.87 | 2.79 |
| | Males | 4.54 | 4.40 | 4.27 | 4.14 | 4.00 | 3.87 | 3.74 | 3.60 | 3.47 | 3.34 | 3.20 |
| 39 | Females | 3.66 | 3.58 | 3.50 | 3.41 | 3.33 | 3.25 | 3.17 | 3.08 | 3.00 | 2.92 | 2.83 |
| | Males | 4.58 | 4.44 | 4.30 | 4.17 | 4.03 | 3.89 | 3.75 | 3.61 | 3.48 | 3.34 | 3.20 |
| 40 | Females | 3.66 | 3.59 | 3.51 | 3.43 | 3.35 | 3.27 | 3.19 | 3.11 | 3.03 | 2.95 | 2.87 |
| | Males | 4.59 | 4.46 | 4.32 | 4.19 | 4.05 | 3.92 | 3.78 | 3.65 | 3.51 | 3.38 | 3.24 |
| >40 | Females | 3.70 | 3.61 | 3.53 | 3.44 | 3.36 | 3.28 | 3.19 | 3.11 | 3.02 | 2.94 | 2.85 |
| | Males | 4.60 | 4.46 | 4.32 | 4.19 | 4.05 | 3.91 | 3.78 | 3.64 | 3.50 | 3.37 | 3.23 |

The invention claimed is:

1. A method of providing a basis for evaluation of a muscle related condition for a subject individual, the method being performed by a computer with a processing unit, and the method comprising the steps of:

scanning a first muscle of the subject individual using a scanning device, wherein the scanning device is configured to perform at least one of: a) magnetic resonance imaging, b) dual-energy X-ray absorptiometry, c) bioelectrical impedance analysis, and d) computed tomography;

quantifying a muscle quantity value of the first muscle for the subject individual in response to the scanning the first muscle;

identifying a muscle volume, muscle mass, cross sectional area of the first muscle, or a combination thereof based on the quantified muscle quantity value;

acquiring at least one data parameter value for the subject individual, wherein the at least one data parameter value relates to a quantified parameter of the subject individual's body composition;

assessing a muscle quality value of the first muscle for the subject individual in response to the scanning the first muscle, wherein the assessing comprises quantifying a muscle fat infiltration value of the first muscle;

accessing a lookup table that comprises a dimension based on the at least one data parameter value for the subject individual, age, sex, weight, and/or muscle type of the first muscle;

comparing the quantified muscle fat infiltration value with a predetermined threshold for the subject individual using the lookup table and based on the at least one data parameter value for the subject individual;

selecting a number of individuals from a database, wherein the database comprises at least one data parameter value for a plurality of individuals and muscle quantity values of a muscle type of said first muscle for said plurality of individuals, wherein the selection of the number of individuals from the database is based on the at least one data parameter value being compared to the subject individual's at least one data parameter value, thereby creating a virtual control group, VCG, comprising the selected individuals;

calculating a numerical prediction value of the muscle quantity values for the selected individuals in the VCG as an individualized and normalized reference value for the quantified muscle quantity value for the subject individual;

comparing the quantified muscle quantity value for the subject individual to the numerical prediction value of the VCG;

combining i) the comparison of the quantified muscle fat infiltration value to the predetermined threshold for the subject individual with ii) the comparison of the quantified muscle quantity value to the numerical prediction value of the VCG; and outputting a two-dimensional visual distribution diagram for the subject individual based on the combining, wherein a first dimension of the visual distribution diagram comprises a muscle quality measure, and wherein a second dimension of the visual distribution diagram comprises a muscle quantity measure adjusted for the subject individual's body composition.

2. The method according to claim 1, wherein the numerical prediction value is a mean value, a median value, or a modelled prediction value of the muscle quantity values for the selected individuals in the VCG.

3. The method according to claim 1, wherein the quantified muscle quantity value is a fat free muscle volume, FFMV, value.

4. The method according to claim 1, wherein the quantified muscle quantity value represents an effective volume of a first part of the first muscle, said first part having a muscle fat infiltration level below the predetermined threshold level, $T_1$, and wherein the effective volume is determined by multiplying the volume of said first part of the first muscle with $1-(1/T_1)*MFI_1$, wherein $MFI_1$ is the muscle fat infiltration level in said first part of the first muscle.

5. The method according to claim 4, wherein the predetermined threshold level, $T_i$, of muscle fat infiltration is between 45-55%.

6. The method according to claim 4, wherein the predetermined threshold level, $T_1$, of muscle fat infiltration is 50%.

7. The method according to claim 4, wherein the predetermined threshold level, $T_1$, of muscle fat infiltration is between 30-80%.

8. The method according to claim 1, wherein the step of comparing the quantified muscle quantity value of the first muscle for the subject individual to the determined numerical prediction value of the VCG comprises a step of determining a measure of the quantified muscle quantity value's deviation from the numerical prediction value.

9. The method according to claim 8, wherein the determined measure of the quantified muscle quantity value's deviation from the numerical prediction value is a number of standard deviations that the quantified muscle quantity value for the subject individual is below or above the numerical prediction value of the VCG.

10. The method according to claim 8, further comprising a step of determining the muscle related condition for the subject individual based on said comparison by determining whether the determined measure of deviation is below a predetermined deviation threshold.

11. The method according to claim 1, wherein the step of selecting the number of individuals from the database comprises a step of selecting individuals whose at least one data parameter value is within a predetermined range of the subject individual's data parameter value.

12. The method according to claim 11, wherein the step of selecting the number of individuals from the database comprises a step of extending the range from the subject individual's data parameter value if a predetermined number of individuals fulfilling the criteria has not been found in the database.

13. The method according to claim 1, wherein the subject individual's quantified muscle quantity value of the first muscle is based on a Magnetic Resonance Imaging, MRI, scan of the subject individual.

14. A system configured to provide a basis for evaluation of a muscle related condition for a subject individual, the system comprising a computer with a processing unit configured to perform a method comprising the steps of:

scanning a first muscle of the subject individual using a scanning device, wherein the scanning device is configured to perform at least one of: a) magnetic resonance imaging, b) dual-energy X-ray absorptiometry, c) bioelectrical impedance analysis, and d) computed tomography;

quantifying a muscle quantity value of the first muscle for the subject individual in response to the scanning the first muscle;

identifying a muscle volume, muscle mass, cross sectional area of the first muscle, or a combination thereof based on the quantified muscle quantity value;

acquiring at least one data parameter value for the subject individual, wherein the at least one data parameter value relates to a quantified parameter of the subject individual's body composition;

assessing a muscle quality value of the first muscle for the subject individual in response to the scanning the first muscle, wherein the assessing comprises quantifying a muscle fat infiltration value of the first muscle;

accessing a lookup table that comprises a dimension based on the at least one data parameter value for the subject individual, age, sex, weight, and/or muscle type of the first muscle;

comparing the quantified muscle fat infiltration value with a predetermined threshold for the subject individual using the lookup table and based on the at least one data parameter value for the subject individual;

selecting a number of individuals from a database, wherein the database comprises at least one data parameter value for a plurality of individuals and muscle quantity values of said first muscle for said plurality of individuals, wherein the selection of the number of individuals from the database is based on the at least one data parameter value being compared to the subject individual's at least one data parameter value, thereby creating a virtual control group, VCG, comprising the selected individuals;

calculating a numerical prediction value of the muscle quantity values for the selected individuals in the VCG as an individualized and normalized reference value for the quantified muscle quantity value for the subject individual;

comparing the quantified muscle quantity value for the subject individual to the numerical prediction value of the VCG;

combining i) the comparison of the quantified muscle fat infiltration value to the predetermined threshold for the subject individual with ii) the comparison of the quantified muscle quantity value to the numerical prediction value of the VCG; and outputting a two-dimensional visual distribution diagram for the subject individual based on the combining, wherein a first dimension of the visual distribution diagram comprises a muscle quality measure, and wherein a second dimension of the visual distribution diagram comprises a muscle quantity measure adjusted for the subject individual's body composition.

15. An evaluation device configured to evaluate a muscle related condition for a subject individual, comprising
a scanning unit configured to scan a first muscle of the subject individual using a scanning device, wherein the scanning device is configured to perform at least one of: a) magnetic resonance imaging, b) dual-energy X-ray absorptiometry, c) bioelectrical impedance analysis, and d) computed tomography;
an acquiring unit configured to acquire a quantified muscle quantity value of the first muscle for the subject individual in response to the scanning the first muscle, wherein the muscle quantity value represents an effective volume of a first part of the first muscle, said first part having an assessed muscle quality value comprising a quantified muscle fat infiltration level below a predetermined threshold level, $T_1$, wherein the effective volume is determined by multiplying the volume of said first part of the first muscle with $1-(1/T_1)*MFI_1$, wherein $MFI_1$ is the muscle fat infiltration level in said first part of the first muscle, wherein the acquiring unit is further configured to identify a muscle volume, muscle mass, cross sectional area of said first part of the first muscle, or a combination thereof based on the quantified muscle quantity value, and wherein the at least one data parameter value relates to a quantified parameter of the subject individual's body composition, and wherein the acquiring unit is further configured to access a lookup table that comprises a dimension based on the at least one data parameter value for the subject individual, age, sex, weight, and/or muscle type of said first part of the first muscle;
a selection unit configured to select a number of individuals from a database, wherein the database comprises at least one data parameter value for a plurality of individuals and muscle quantity values of said first muscle for said plurality of individuals, wherein the selection of a number of individuals from the database is based on the at least one data parameter value being compared to the subject individual's at least one data parameter value, thereby creating a virtual control group, VCG, comprising the selected individuals;
a calculation unit configured to calculate a numerical prediction value of the muscle quantity values for the individuals in the VCG as an individualized and normalized reference value for the quantified muscle quantity value for the subject individual; and
a comparison unit configured to compare the quantified muscle quantity value for the subject individual to the numerical prediction value of the VCG, and to combine the comparison of the quantified muscle fat infiltration level to the predetermined threshold level, $T_1$, for the subject individual using the lookup table and based on the at least one data parameter value for the subject individual, with the comparison of the quantified muscle quantity value to the numerical prediction value of the VCG, to provide a two-dimensional visual distribution diagram for the subject individual based on the combining, wherein a first dimension of the visual distribution diagram comprises a muscle quality measure and wherein a second dimension of the visual distribution diagram comprises a muscle quantity measure adjusted for the body composition of the subject individual.

* * * * *